(12) United States Patent
Imajo et al.

(10) Patent No.: US 6,974,174 B2
(45) Date of Patent: Dec. 13, 2005

(54) RETRACTABLE SEATS

(75) Inventors: Taku Imajo, Toyota (JP); Taiyou Ootsuka, Toyota (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/786,504

(22) Filed: Feb. 25, 2004

(65) Prior Publication Data

US 2004/0169391 A1 Sep. 2, 2004

(30) Foreign Application Priority Data

| Feb. 28, 2003 | (JP) | ............................. 2003-053255 |
| Feb. 28, 2003 | (JP) | ............................. 2003-053257 |
| Aug. 20, 2003 | (JP) | ............................. 2003-296495 |
| Sep. 22, 2003 | (JP) | ............................. 2003-330549 |

(51) Int. Cl.[7] .............................................. B60N 2/30
(52) U.S. Cl. ............................. 296/65.09; 296/65.08; 296/65.18; 296/69; 297/316; 297/340
(58) Field of Search ............................. 296/63, 65.01, 296/65.05, 65.09, 65.11, 65.12, 65.16, 66, 296/65.17, 69, 65.18; 297/340, 316, 378.1

(56) References Cited

U.S. PATENT DOCUMENTS

| 480,307 | A | * | 8/1892 | Wells .......................... 296/66 |
| 4,957,321 | A |   | 9/1990 | Martin et al. |
| 5,269,581 | A |   | 12/1993 | Odagaki et al. |
| 5,890,758 | A |   | 4/1999 | Pone et al. |
| 6,070,934 | A | * | 6/2000 | Schaefer et al. .............. 297/14 |
| 6,106,046 | A | * | 8/2000 | Reichel ................... 296/65.09 |
| 6,113,191 | A | * | 9/2000 | Seibold ................... 297/378.1 |
| 6,234,553 | B1 |  | 5/2001 | Eschelbach et al. |
| 6,270,141 | B2 | * | 8/2001 | Moon et al. ............. 296/65.17 |
| 6,382,491 | B1 | * | 5/2002 | Hauser et al. ........... 296/65.05 |
| 6,435,589 | B2 |  | 8/2002 | Shimizu et al. |
| 6,601,900 | B1 |  | 8/2003 | Seibold |
| 6,601,901 | B1 | * | 8/2003 | Schambre et al. ....... 296/65.09 |
| 6,672,662 | B1 | * | 1/2004 | Balk ......................... 297/244 |
| 6,817,669 | B2 | * | 11/2004 | Roth et al. ................. 297/340 |
| 2001/0001526 | A1 | * | 5/2001 | Moon et al. ............. 296/65.17 |
| 2003/0001419 | A1 | * | 1/2003 | Roth et al. ............... 297/378.1 |
| 2004/0245829 | A1 | * | 12/2004 | Haladuda et al. ........... 297/340 |

FOREIGN PATENT DOCUMENTS

| JP | 2001-328476 | 11/2001 |
| JP | 2002-316567 | 10/2002 |

* cited by examiner

Primary Examiner—Patricia L. Engle
(74) Attorney, Agent, or Firm—Patterson, Thuente, Skaar & Christensen, P.A.

(57) ABSTRACT

A retractable seat may include a seat cushion, a seat back rotatably supported on the seat cushion, and a link mechanism for supporting the seat cushion on a floor. The link mechanism includes a front leg and a rear leg that are pivotally connected to the seat cushion and the floor so that the seat cushion and the seat back can be switched between a use condition and a retracted condition. The seat may further include a restraint mechanism provided on the floor for preventing the link mechanism from moving when the seat is in a use condition.

12 Claims, 46 Drawing Sheets

RETRACTABLE SEATS

BACKGROUND OF THE INVENTION

1. Field of the Invention

The present invention relates to retractable seats for a vehicle. More particularly, the present invention relates to retractable seats in which the seat can be retracted when a seat cushion is brought down to the floor by means of a link mechanism.

2. Description of the Related Art

A retractable seat of this type is taught, for example, by Japanese Laid-Open Patent Publication No. 2002-316567.

In the known art, the seat is vertically movably supported on a vehicle floor by means of front and rear links. A hinge means provided on a seat support point of the rear link has a rotation restriction function for preventing the rotation of the rear link. Due to this rotation restriction function, the seat can be maintained in a retracted condition in which the seat is retracted into a receiving recess formed in the vehicle floor and maintained in a use condition in which the seat is positioned above the receiving recess.

However, in the retractable seat that is supported by the links, the link rotation regulating function of the hinge means does not provide sufficient support strength to the seat when it is in the use condition. That is, when an excessive load is applied to the seat, for example, as in the case of a collision of the vehicle, the seat may not be sufficiently supported.

SUMMARY OF THE INVENTION

It is, accordingly, one object of the present teachings to provide an improved, retractable vehicle seat.

For example, in one aspect of the present teachings, a retractable seat may include a seat cushion, a seat back rotatably supported on the seat cushion, and a link mechanism for supporting the seat cushion on a floor. The link mechanism includes a front leg and a rear leg that are pivotally connected to the seat cushion and the floor, so that the seat cushion and the seat back can be switched between a use condition and a retracted condition. The seat may further include a restraint mechanism provided on the floor for preventing the link mechanism from moving when the seat is in a use condition.

According to this retractable seat, the restraint mechanism may provide sufficient support strength to the seat when the seat is in the use condition. Therefore, even if an excessive load is applied to the seat, the seat can be sufficiently and reliably supported.

Other objects, features, and advantages, of the present invention will be readily understood after reading the following detailed description together with the accompanying drawings and the claims.

DETAILED DESCRIPTION OF THE INVENTION

Nine detailed representative embodiments of the present teachings will now be described in further detail with reference to FIGS. 1 to 47.

First Detailed Representative Embodiment

The first detailed representative embodiment will now described with reference to FIGS. 1 to 17.

Figure 1:
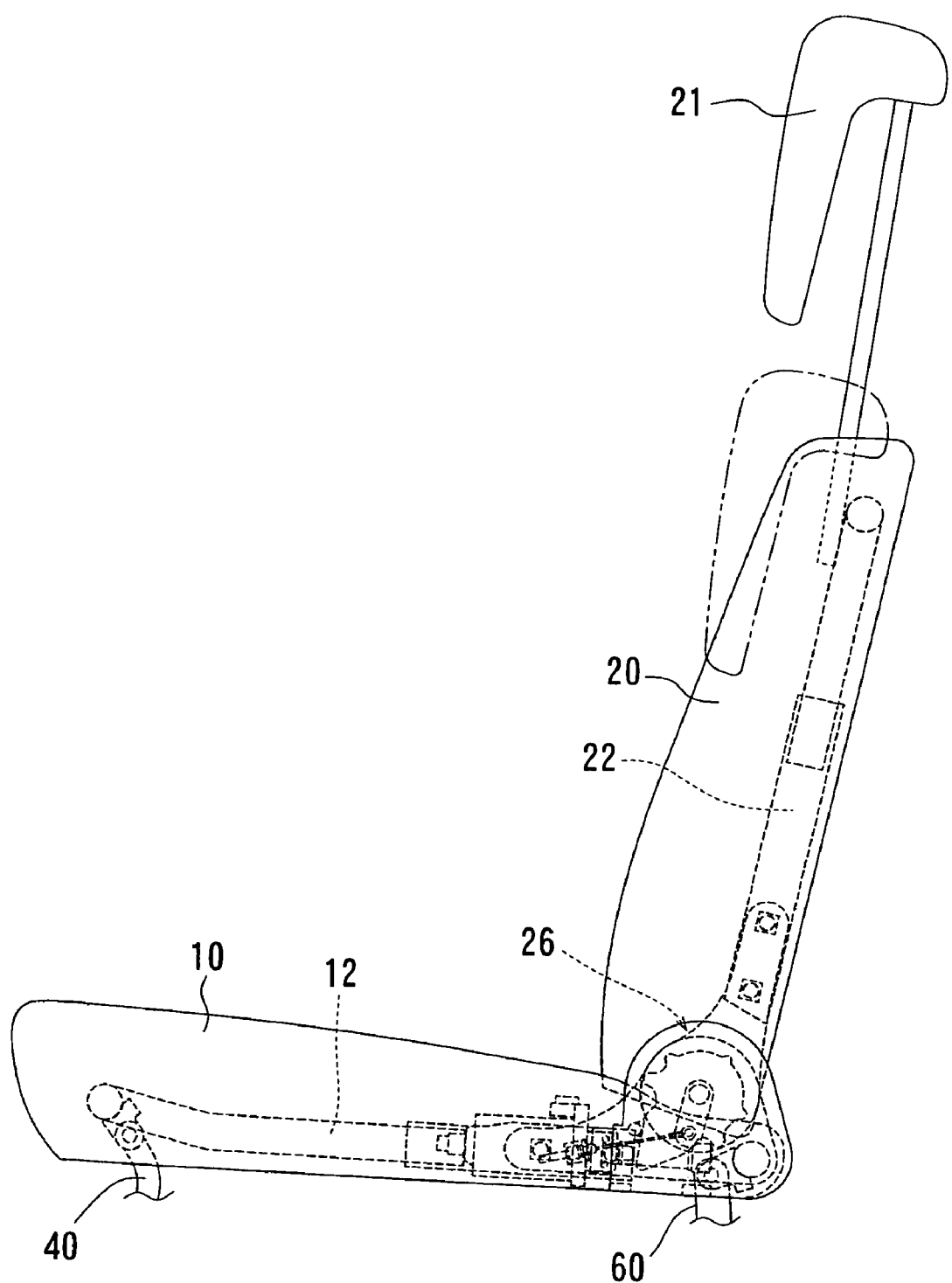
FIG. 1 is a partially omitted side view of a retractable vehicle seat according to a first embodiment of the present invention.
Figure 2:
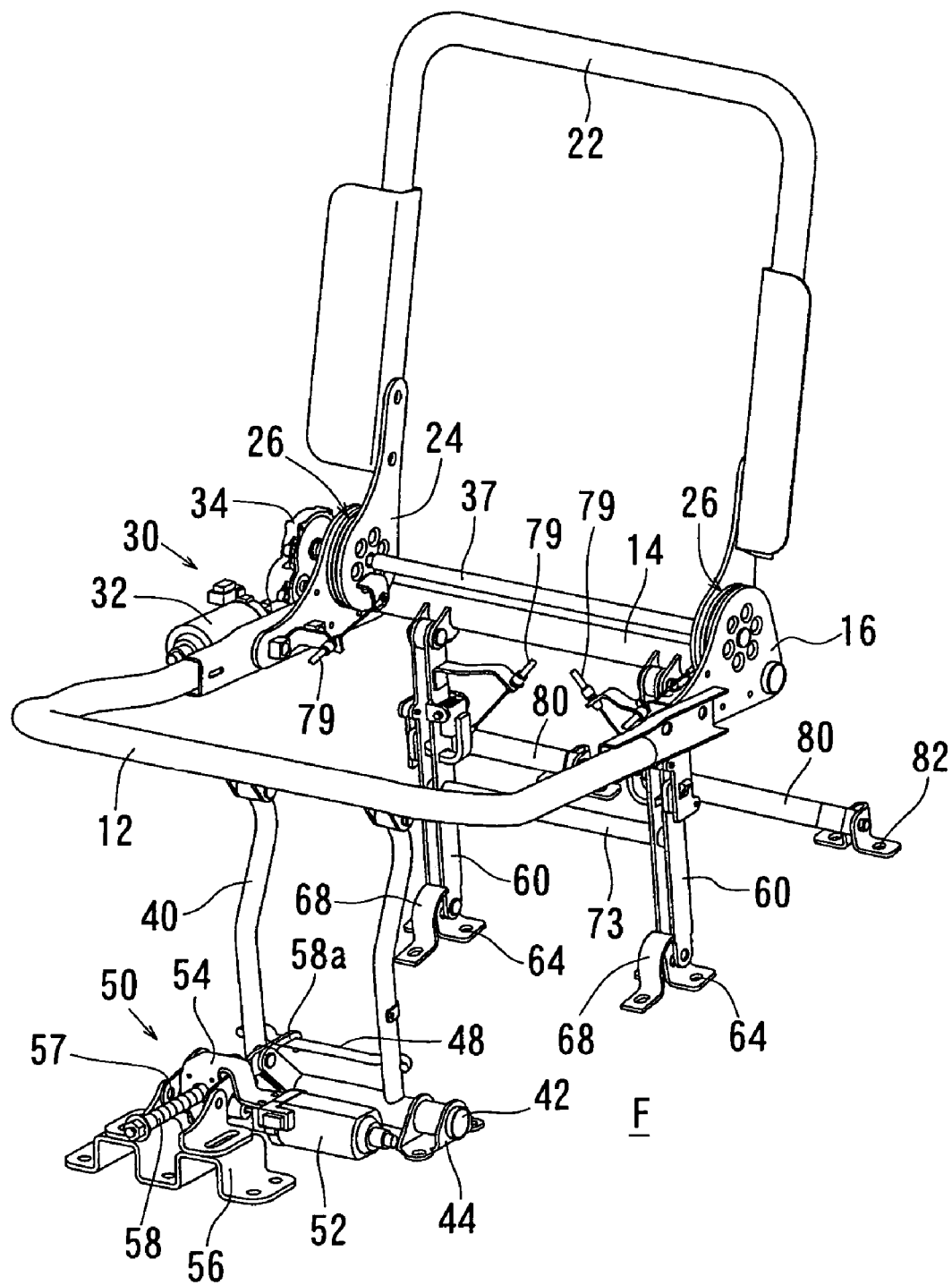
FIG. 2 is a perspective view of a frame assembly of the retractable seat.
Figure 3:
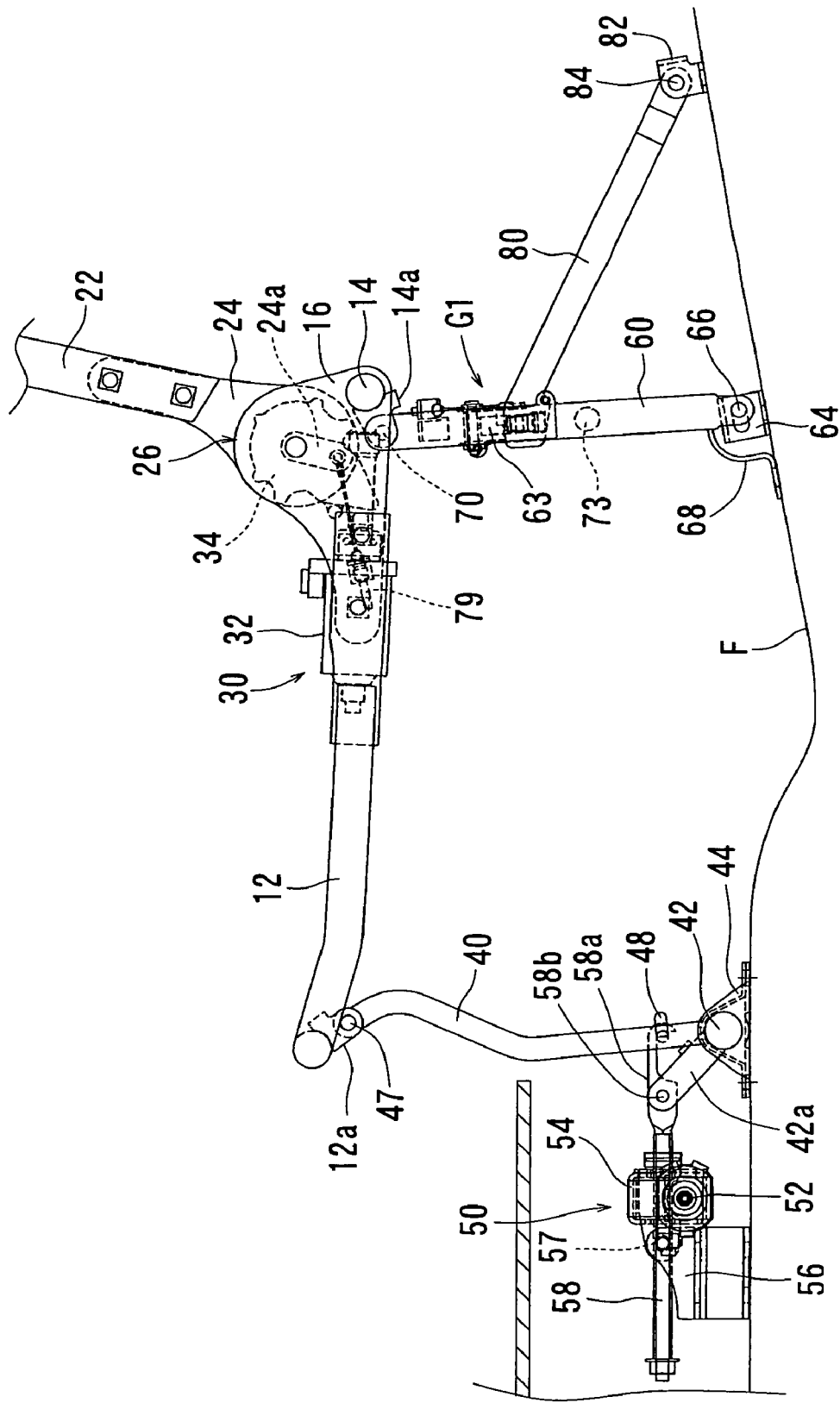
FIG. 3 is a partial side view of the frame assembly of the retractable seat.

In a retractable seat shown in FIGS. 1 to 3, it is possible to adjust forward and backward tilting angles of a seat back 20 with respect to a seat cushion 10 by means of a reclining device 26. The reclining devices 26 can tilt the seat back 20 forwardly and superimpose the same on the seat cushion 10, and retain the seat back 20 in that condition. The seat cushion 10 is supported on a vehicle floor F via a pair of right and left front legs 40 and a pair of right and left rear legs 60 (FIGS. 2 and 3).

The seat back 20 includes a headrest 21 (FIG. 1). The headrest 21 is vertically movably attached to the seat back 20, so that its height can be adjusted. When the seat is to be retracted, the headrest 21 can be moved to a lowermost position, so as to be superimposed on a front surface of the seat back 20, as shown by a broken line in FIG. 1.

As shown in FIGS. 2 and 3, the reclining device 26 interconnects a cushion frame 12 of the seat cushion 10 and a back frame 22 of the seat back 20. The front legs 40 and the rear legs 60 support the cushion frame 12 on the floor F The front legs 40 and the rear legs 60 preferably form a four-joint parallel link mechanism together with the cushion frame 12 and the floor F. The link mechanism thus formed permits the cushion frame 12 (the seat cushion 10) to fold down onto the floor F.

Figure 4:
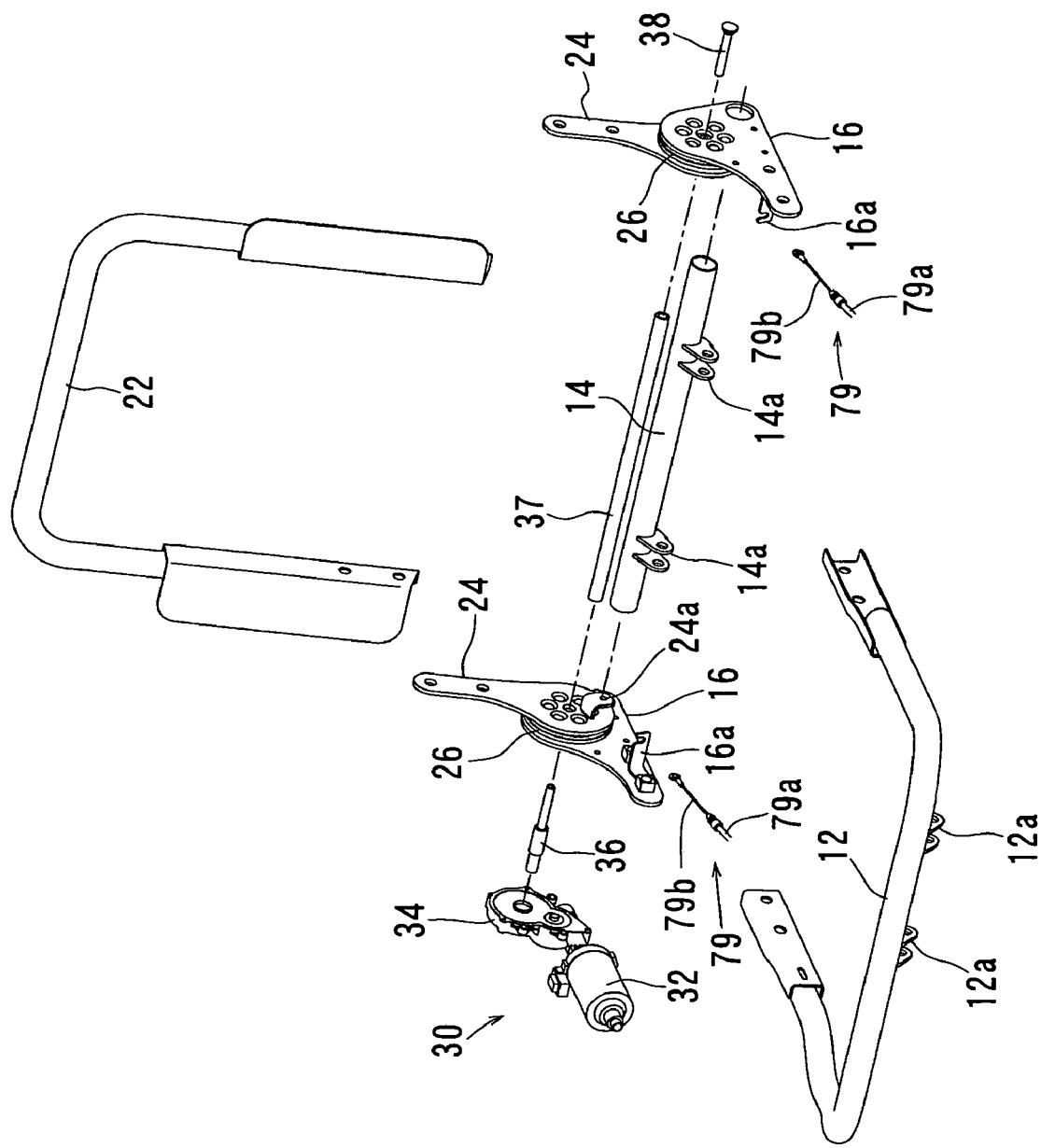
FIG. 4 is a partially exploded perspective view of the frame assembly.

As shown in FIG. 4, each of the cushion frame 12 and the back frame 22 is mainly made from a U-shaped pipe. Lower arms 16 are attached to both ends of the cushion frame 12, and upper arms 24 are attached to both ends of the back frame 22. The upper and lower arms 16 and 24 are connected together via the reclining devices 26. Further, the right and left lower arms 16 are interconnected by a reinforcing rod 14 extending therebetween.

When the seat back 20 is tilted forwardly and backwardly by the reclining devices 26, the resulting tilting motions of the seat back 20 can preferably be transmitted to two lock mechanisms G1 (which will be hereinafter described) via right and left individual cables 79. That is, cable brackets 16a are attached to the right and left lower arms 16, and connection brackets 24a are attached to the right and left upper arms 24. Each of the cables 79 includes an outer tube 79a and an inner cable 79b. One end of the outer tube 79a is connected to the cable bracket 16a. One end of the inner cable 79b is connected to the connection bracket 24a.

A driving means 30 for driving the reclining devices 26 is attached to one of the lower arms 16 of the cushion frame 12. The driving means 30 includes a motor 32 and a differential mechanism 34. The motor 32 can be controllably rotated in normal and reverse directions. Rotational motion of the motor 32 may preferably be transmitted to an operation shaft 36 of one of the reclining devices 26 via the differential mechanism 34, thereby rotating the operation shaft 36. The rotational motion of the operation shaft 36 is transmitted to a reclining shaft 38 of the other of the reclining devices 26 via a connecting rod 37. As a result, the driving means 30 may synchronously operate the two reclining devices 26.

Figure 5:
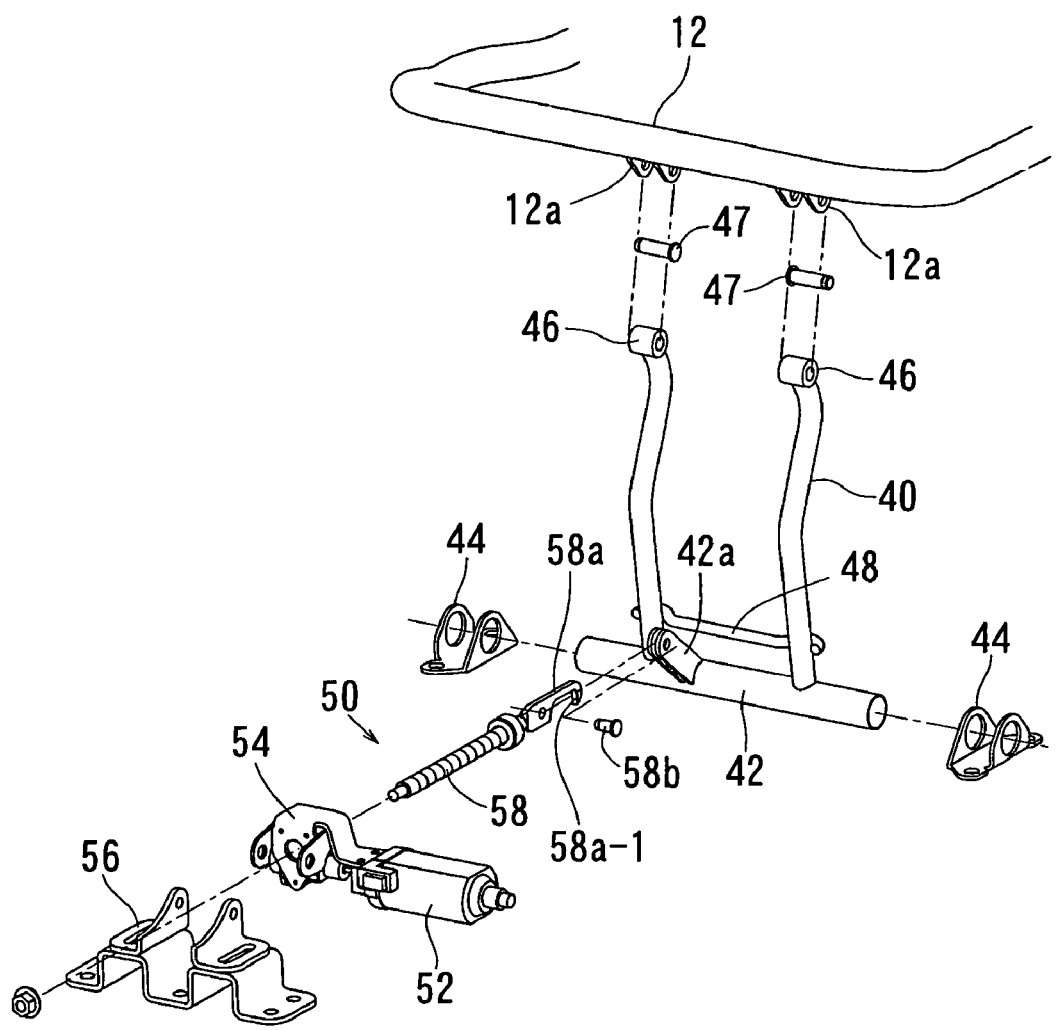
FIG. 5 is a partially exploded perspective view of the frame assembly.

As shown in FIG. 5, each of the front legs 40 is formed from a pipe. Lower ends of the front legs 40 are fixed to a lower supporting member 42. Further, upper ends of the front legs 40 are respectively provided with upper supporting portions 46. Both ends of the lower supporting member 42 are rotatably supported by a pair of bearing brackets 44 that are fixed to the floor F. The two upper supporting portions 46 are respectively rotatably connected to right and left hinge brackets 12a provided on a front lower surface of the cushion frame 12 via hinge pins 47. Thus, the front legs 40 constitute a part of a parallel link with respect to a front portion of the cushion frame 12 and the floor F.

As shown in, for example, FIGS. 2, 3 and 5, a driving means 50, for folding down the cushion frame 12 onto the floor F or for restoring it to an original position, is positioned in front of the front legs 40. The driving means 50 includes a motor 52 and a differential mechanism 54. As best shown in FIG. 3, the motor 52 and the differential mechanism 54 are vertically rotatably attached to a mounting bracket 56 via a pin 57. As will be appreciated, the mounting bracket 56 may preferably be fixed to the floor F. The motor 52 can be controllably rotated in normal and reverse directions, and its rotational motion may preferably be converted to a reciprocating motion of an operating member 58 (i.e., screw rod) of the differential mechanism 54. A connection member 58a is connected to a forward end of the operating member 58. The connection member 58a is rotatably connected to a connection member or connection arm 42a via a connection pin 58b. As will be recognized, the connection arm 42a is fixed to the lower supporting member 42 of the front legs 40 and is inclined forwardly. Further, the forward end of the connection member 58a is provided with a hook 58a-1. The hook 58a-1 is positioned, so as to engage and disengage an engagement member 48 that is fixed to a lower portion of the front legs 40.

Figure 6:
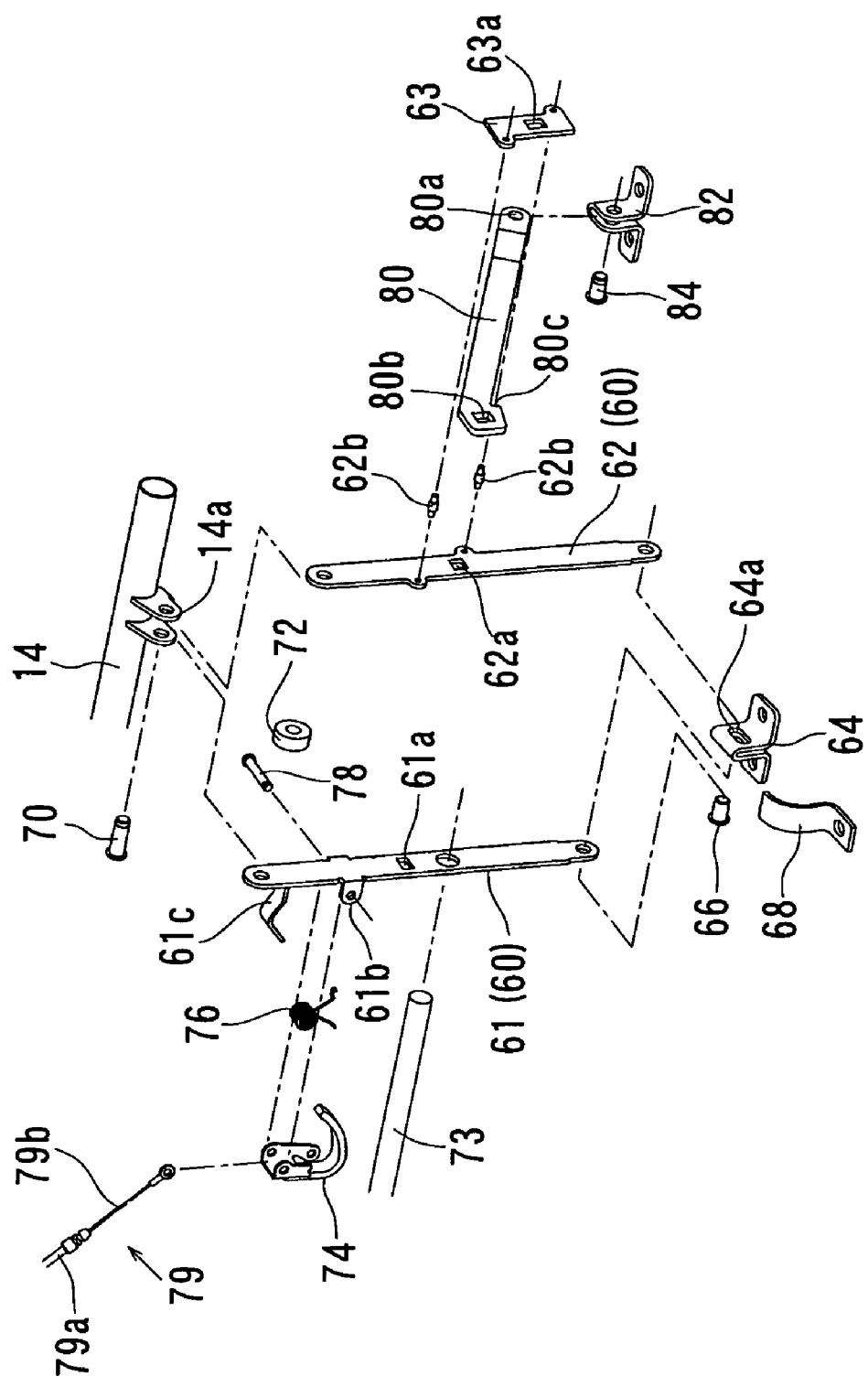
FIG. 6 is a partially exploded perspective view of the frame assembly.
Figure 7:
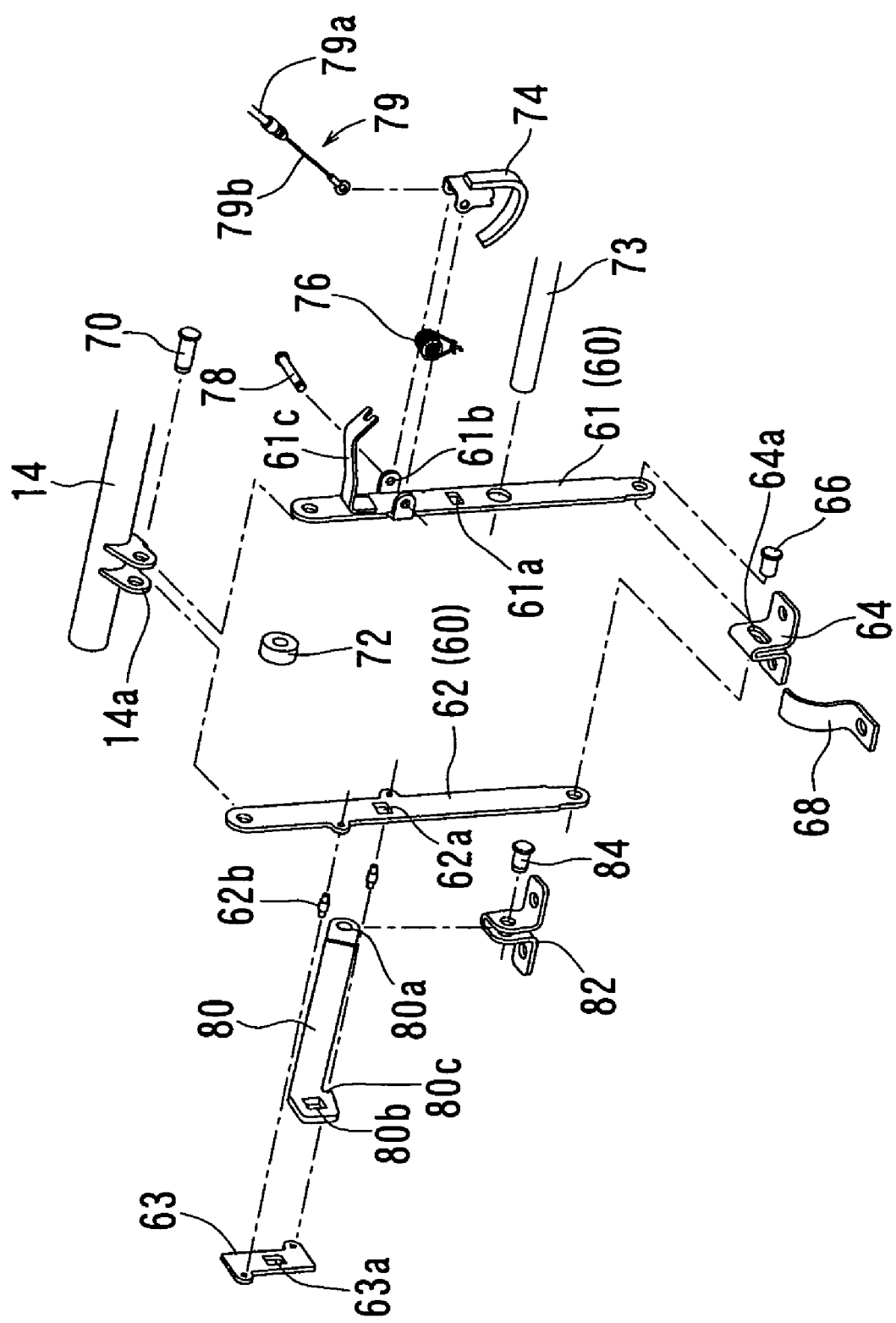
FIG. 7 is a partially exploded perspective view of the frame assembly.

As shown in FIGS. 2, 6, and 7, the rear legs 60 are have the same construction and are arranged symmetrically. Each of the rear legs 60 comprises two plate members 61 and 62 (i.e., inner and outer plate members 61 and 62). Lower end portions of the two plate members 61 and 62 are positioned so as to sandwich a bearing bracket 64 fixed to the floor F, and are pivotally connected to the bearing bracket 64 via a hinge pin 66 that is inserted into an elongated hole 64a of the bearing bracket 64. A stopper 68 is disposed in front of the bracket 64 and fixed to the floor F. The function of the elongated hole 64a and the stopper 68 will be hereinafter described.

Upper end portions of the two plate members 61 and 62 are connected to a hinge bracket 14a via a hinge pin 70, with a spacer 72 interleaved therebetween. As best shown in FIG. 2, the hinge bracket 14a is fixed to the reinforcing rod 14 of the cushion frame 12 and sandwiches the upper end portions of the plate members 61 and 62. Thus, the right and left rear legs 60 constitute a part of the parallel link mechanism. In addition, the right and left rear legs 60 are interconnected by means of a reinforcing rod 73 that extends therebetween.

The plate members 61 and 62 respectively have lock holes 61a and 62a that constitute a part of the lock mechanism G1. The outer plate member 62 is provided with a retaining plate 63 having a lock hole 63a that constitutes the lock mechanism G1. The retaining plate 63 is attached to the outer plate member 62, with interleaving a pair of upper and lower guide pins 62b therebetween. That is, a gap is formed between the plate member 62 and the retaining plate 63 by means of the guide pins 62b. A support member 80 (i.e., restraint mechanism or support mechanism, which will be hereinafter described) is slidably received in the gap formed between the plate member 62 and the retaining plate 63.

Figure 8:
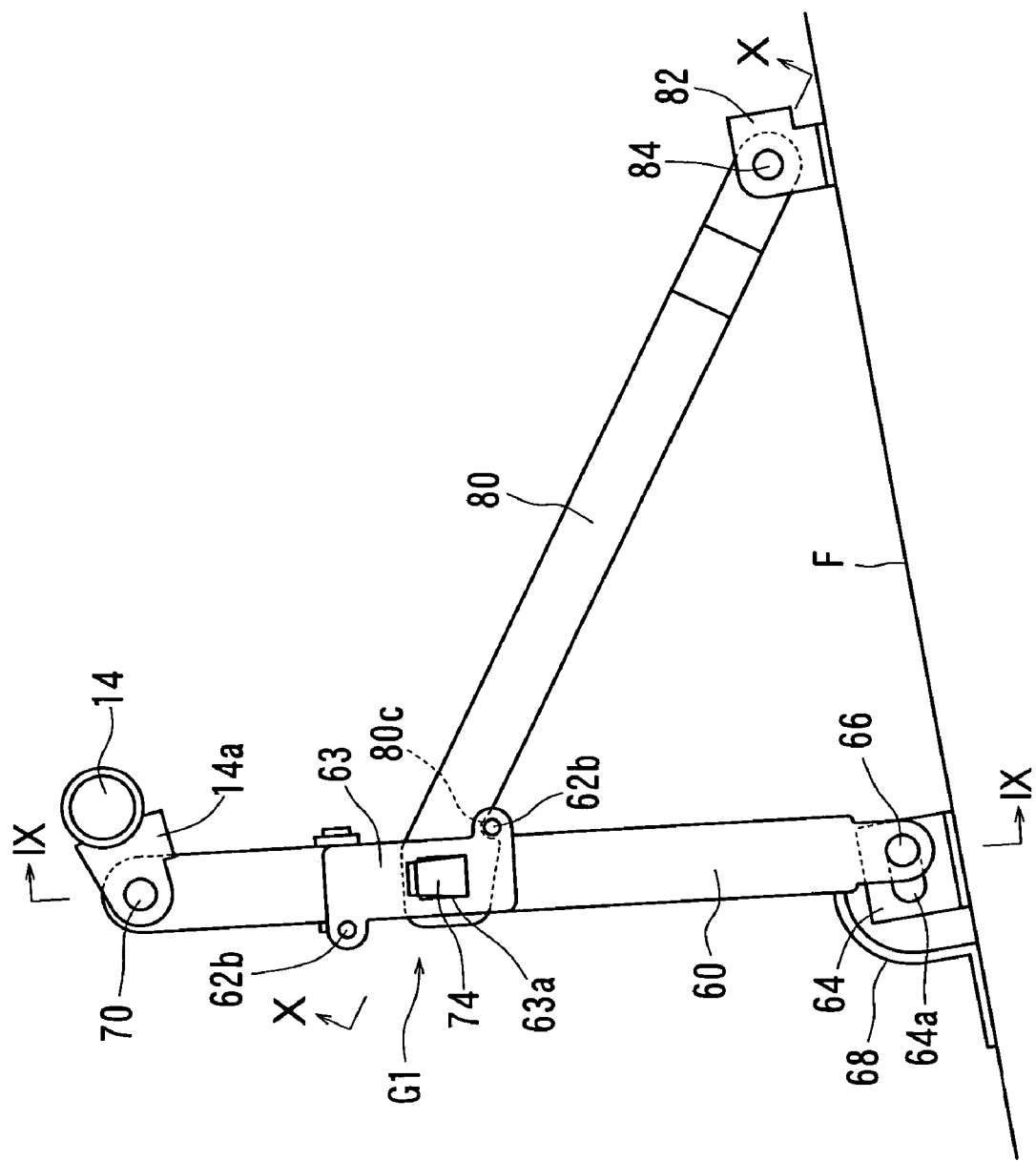
FIG. 8 is a partial side view of the frame assembly of the retractable seat.
Figure 9:
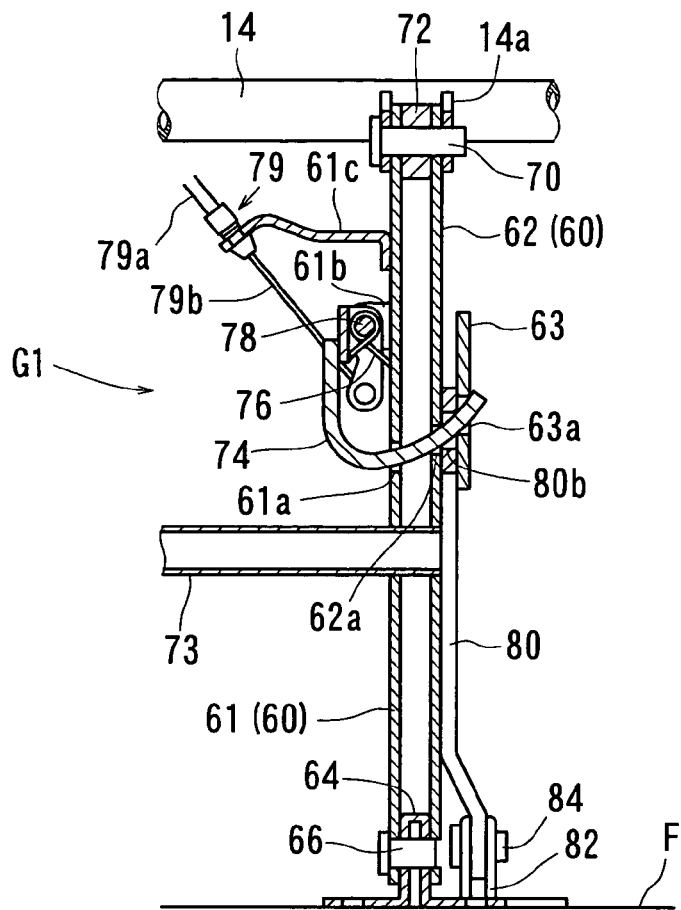
FIG. 9 is a cross-sectional view taken along line IX—IX in FIG. 8.

As shown in FIGS. 6 to 10, the inner plate member 61 is provided with a bearing bracket 61b and a cable bracket 61c. A lock member 74 that constitutes another portion of the lock mechanism G1 is rotatably supported on the bearing bracket 61b via a hinge pin 78. The hinge pin 78 is arranged inside of the rear legs 60, so as to extend along a longitudinal direction of the seat. As best shown in FIG. 9, the lock member 74 has a hook-shape forward end portion which is constructed to enter the lock hole 63a of the retaining plate 63 through the lock holes 61a and 62a of the plate members 61 and 62. Further, the hinge pin 78 is provided with a spring 76. As will be appreciated, the spring 76 is arranged and constructed to appropriately urge the lock member 74 in a direction that the forward end portion of the lock member 74 can be rotated to enter or engage the lock holes 61a, 62a, and 63a.

The other end of the outer tube 79a of the cable 79 is connected to the cable bracket 61c. The other end of the inner cable 79b is connected to the lock member 74. Therefore, when the inner cable 79b is pulled, the lock member 74 rotates against a force of the spring 76, so as to be retracted from the lock holes 61a, 62a, and 63a.

Each of the right and left rear legs 60 includes the support member 80 that supports the rear legs 60 from behind thereof. As shown in FIGS. 6 and 7, a lower end portion of the support member 80 is formed with a shaft hole 80a. The support member 80 is supported on a bracket 82, disposed on the floor F, via a hinge pin 84 that is passed through the shaft hole 80a. Further, an upper end portion of the support member 80 is formed with a lock hole 80b that constitutes a part of the lock mechanism G1. As described above, the support member 80 is slidably received in the gap formed between the plate member 62 and the retaining plate 63 of the rear leg 60. The lock hole 80b of the support member 80 can be aligned with the lock holes 61a, 62a, and 63a, on the rear leg 60 and can receive the forward end portion of the lock member 74.

This retractable seat can be switched between a use condition shown in FIGS. 1 to 3 and a retracted condition (FIGS. 16(A) and 16(B)) by operating the link mechanism described above. As will be appreciated, when the seat is in the use condition, the rear legs 60 may preferably be supported by the support members 80. The lock mechanisms G1 may function to keep a condition in which the rear legs 60 are supported by the support members 80. The lock mechanisms G1 will be hereinafter described in detail.

Figure 10:
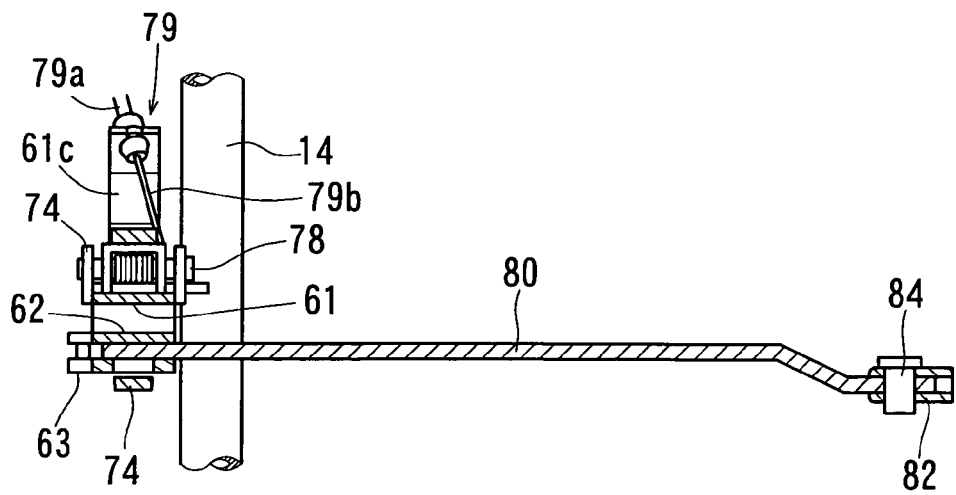
FIG. 10 is a cross-sectional view taken along line X—X in FIG. 8.
Figure 11:
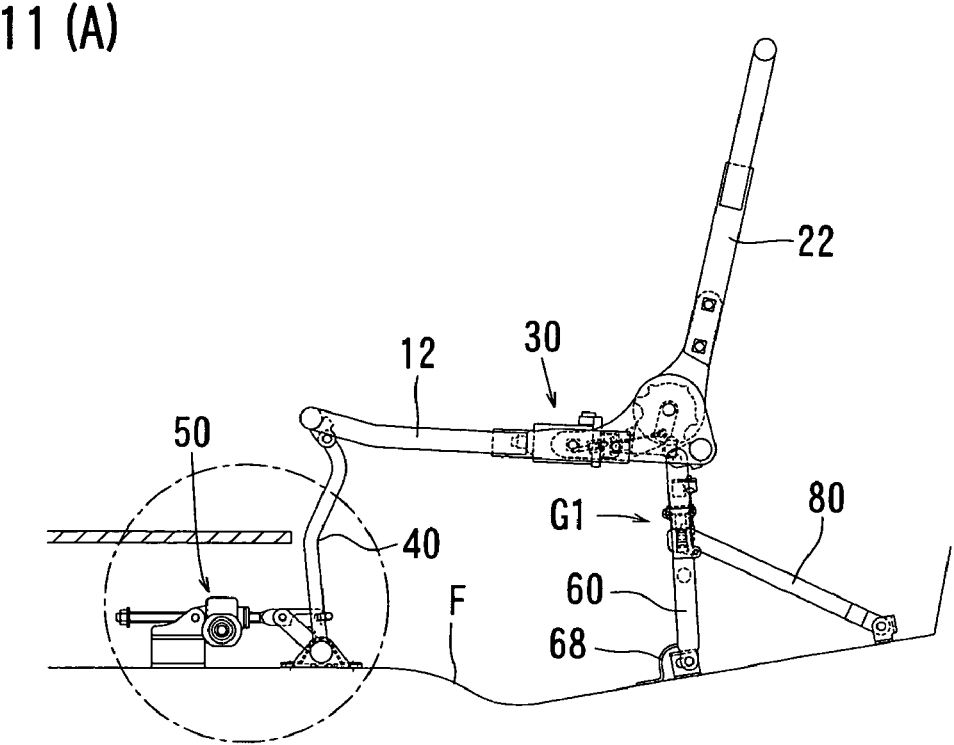
FIG. 11(A) is a side view of the frame assembly, illustrating a condition in which the seat is in a use condition.
FIG. 11(B) is an enlarged view of an encircled portion of FIG. 11(A)
Figure 11:
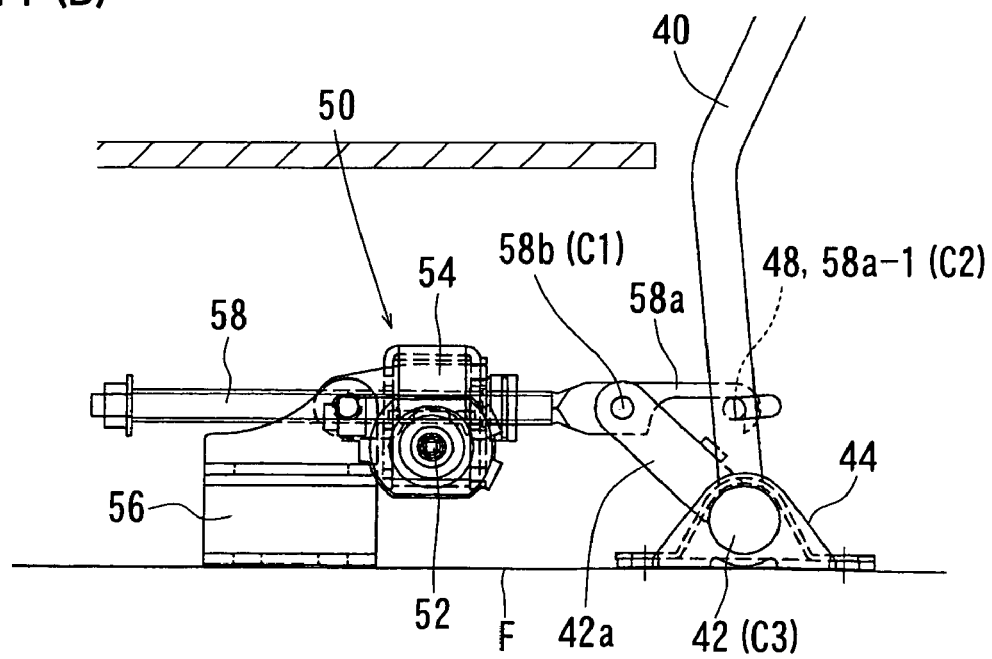
Figure 12:
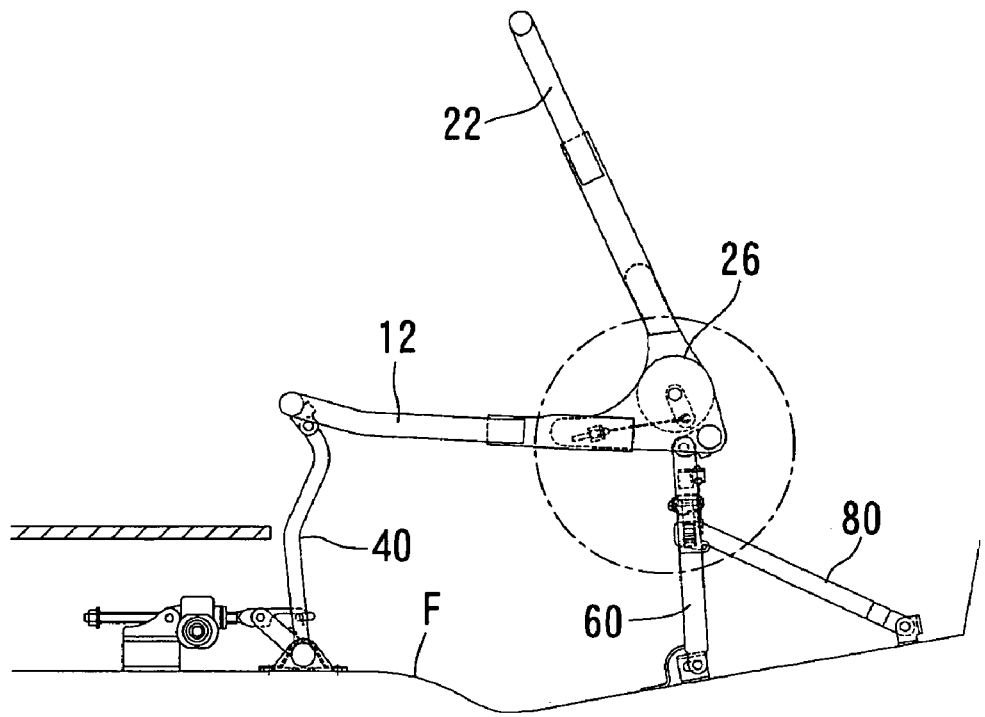
FIG. 12(A) is a side view of the frame assembly, illustrating a condition in which a seat back is started to be tilted forwardly.
FIG. 12(B) is an enlarged view of a encircled portion of FIG. 12(A)
Figure 12:
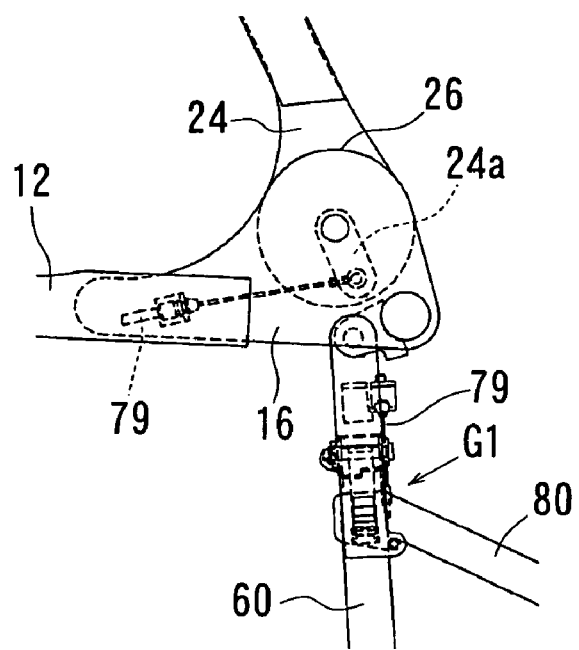
Figure 13:
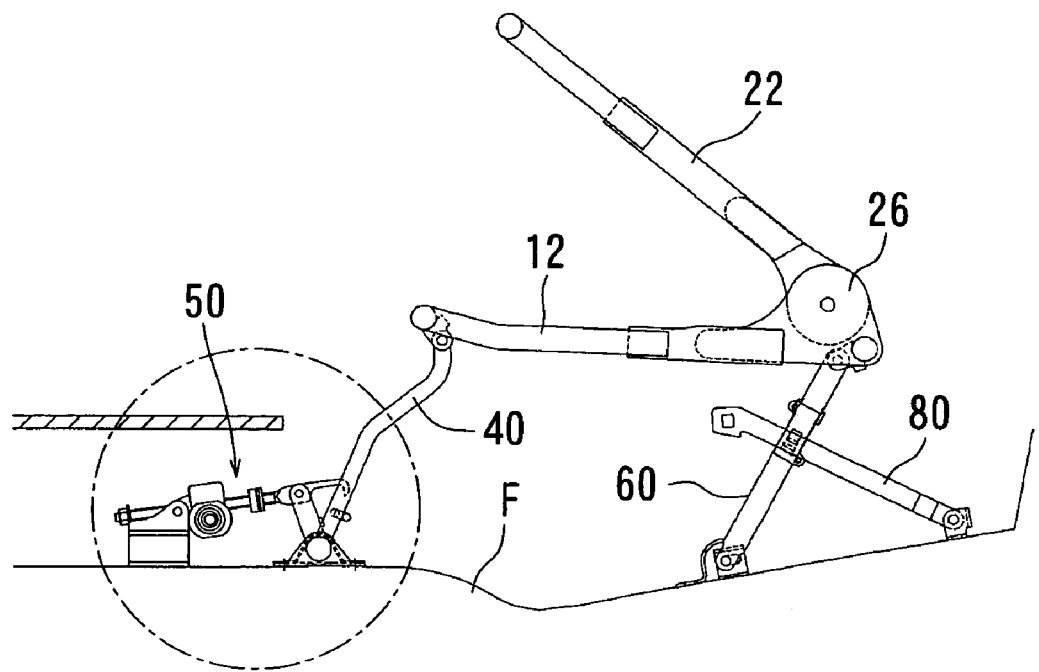
FIG. 13(A) is a side view of the frame assembly, illustrating a condition in which the seat back is further tilted forwardly (i.e., an initial or first intermediate condition of the seat)
FIG. 13(B) is an enlarged view of an encircled portion of FIG. 13(A)
Figure 13:
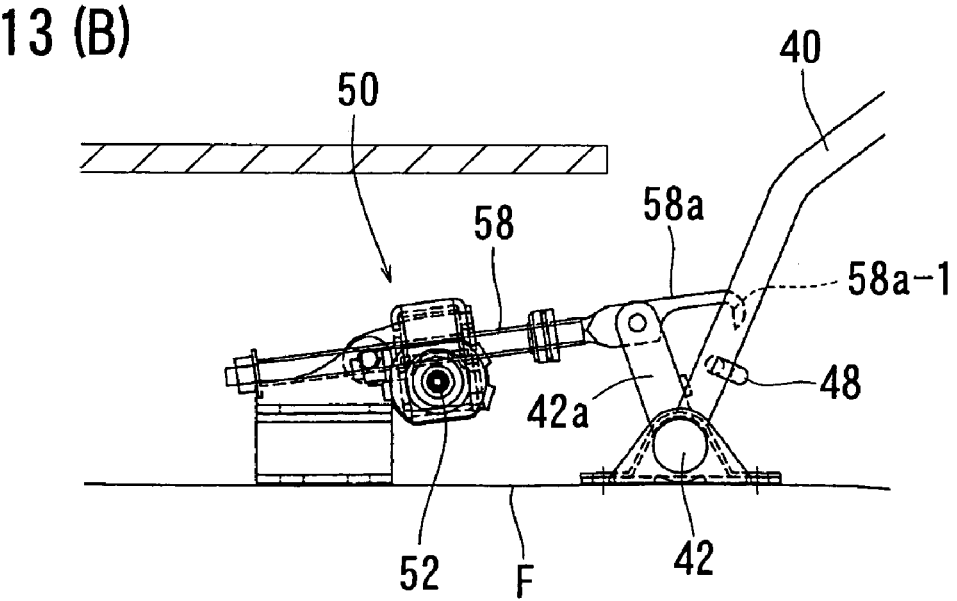
Figure 14:
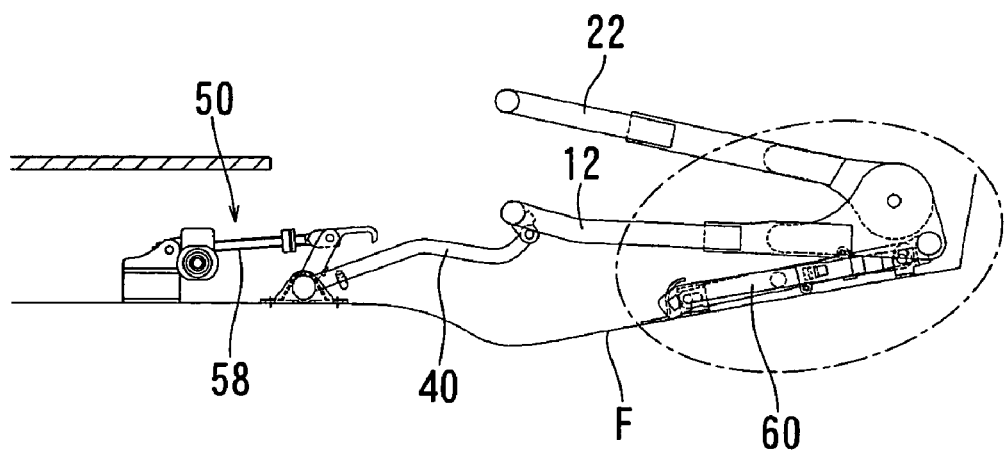
FIG. 14(A) is a side view of the frame assembly, illustrating a condition in which the seat back is further tilted forwardly (i.e., a second intermediate condition of the seat)
FIG. 14(B) is an enlarged view of an encircled portion of FIG. 14(A)
Figure 14:
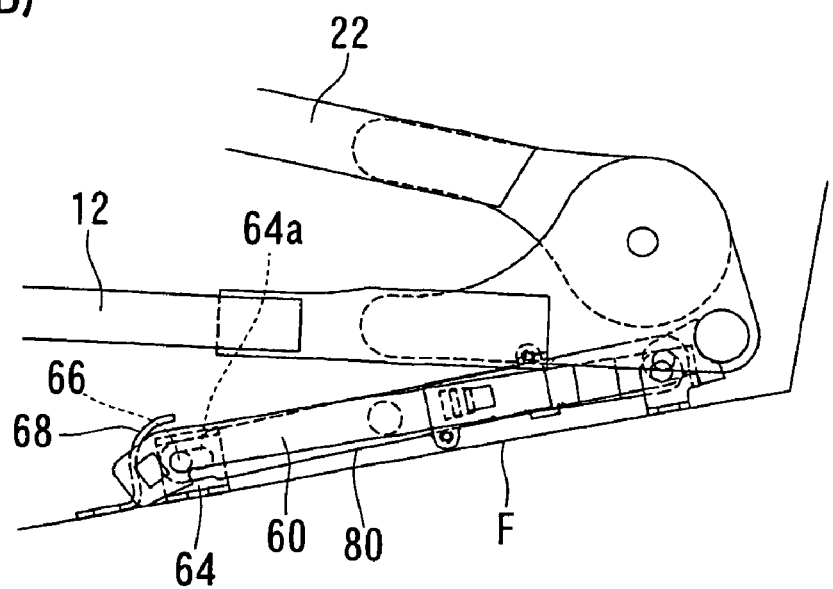
Figure 15:
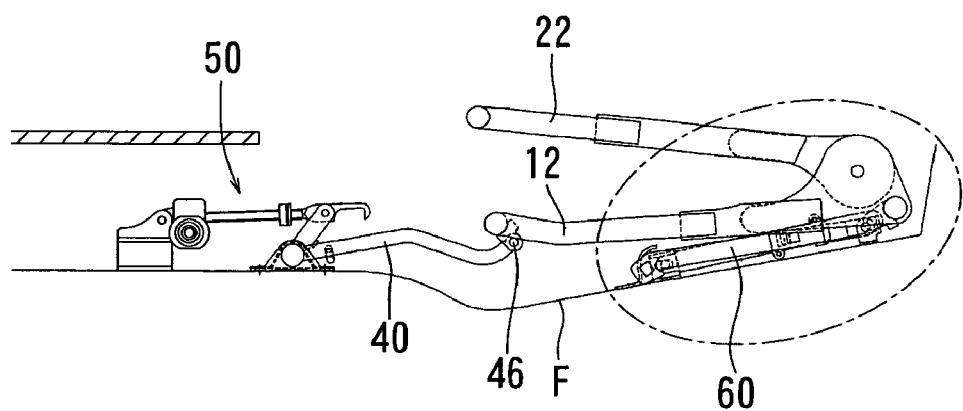
FIG. 15(A) is a side view of the frame assembly, illustrating a condition in which the seat back is further tilted forwardly (i.e., a third intermediate condition of the seat)
FIG. 15(B) is an enlarged view of an encircled portion of FIG. 15(A)
Figure 15:
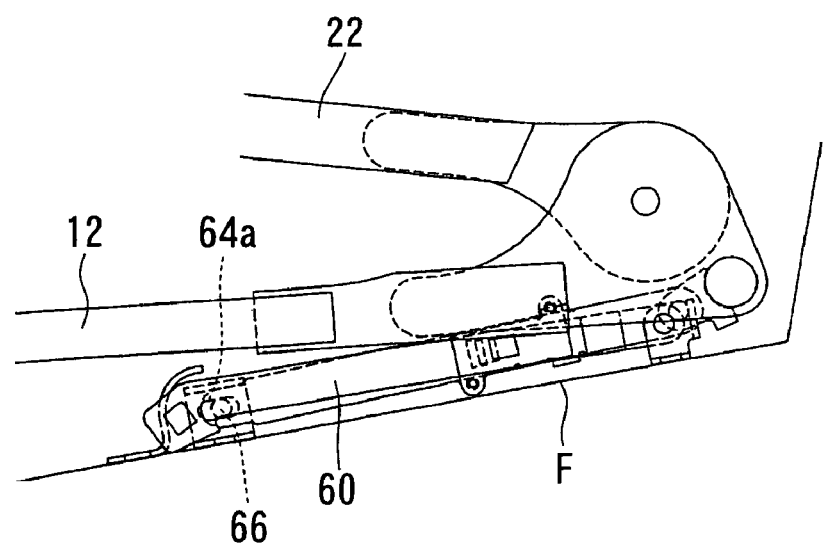
Figure 16:
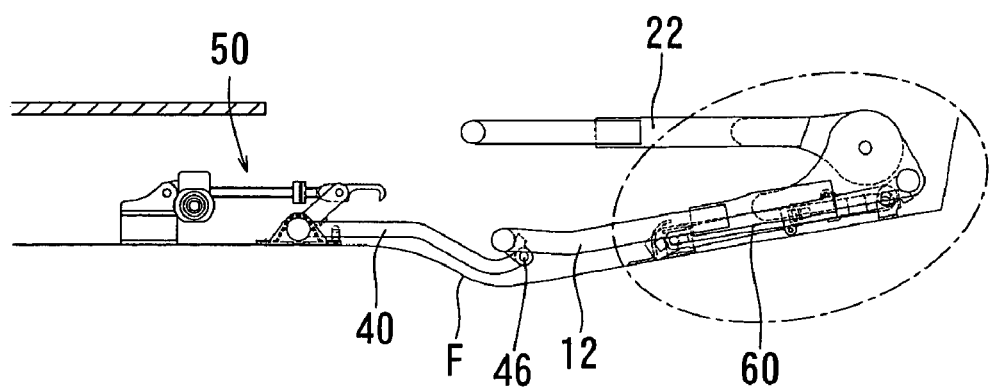
FIG. 16(A) is a side view of the frame assembly, illustrating a condition in which the seat is in a retracted condition.
FIG. 16(B) is an enlarged view of an encircled portion of FIG. 16(A)
Figure 16:
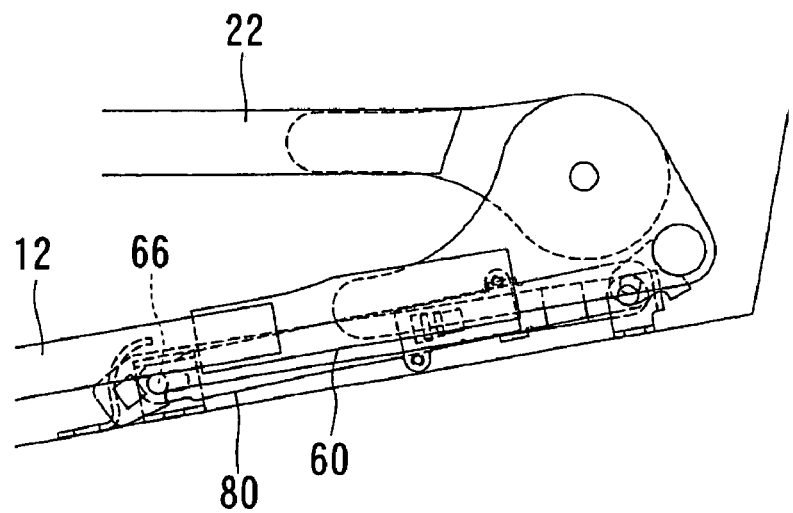

When the seat is in the use condition, the upper end portion of each of the support members 80 is positioned in the gap formed between the plate member 62 and the retaining plate 63 of the rear leg 60 (FIGS. 8 and 10). In this condition, a lock portion 80c, formed on the lower surface of the upper end portion of the support member 80, engages the lower guide pin 62b (FIG. 8). As a result, the lock hole 80b of the support member 80 may preferably be positioned so as to align with the lock holes 61a, 62a, and 63a, of the rear leg 60. The lock holes 61a, 62a, 63a, and 80b, thus aligned with each other, receive the hook-shape forward end portion of the lock member 74 (FIG. 9). That is, a condition in which the lock hole 80b is aligned with the lock holes 61a, 62a, and 63a, on the rear leg 60 means a condition in which the hook-shape forward end portion of the lock member 74 can be introduced thereinto (FIG. 9).

The lock member 74 is urged counterclockwise in FIG. 9 around the hinge pin 78 by means of the spring 76. Therefore, the forward end portion of the lock member 74 passes through the lock holes 61a and 62a of the plate members 61 and 62, and the lock hole 80b of the support member 80, and extends into the lock hole 63a of the retaining plate 63. Thus, the upper end portion of the support member 80 and the rear leg 60 may preferably be interconnected. That is, the lock mechanism G1 may preferably interconnect the upper end portion of the support member 80 and the rear leg 60 and maintain a condition in which they are interconnected. In this condition, the support member 80 supports the rear leg 60 on the floor F from the behind side thereof. As shown in FIG. 8, when the seat is in the use condition, the rear leg 60, the support member 80, and the floor F, form a triangle (in this embodiment, substantially a right triangle).

As described above, when the inner cable 79b of the cable 79 is pulled, the lock member 74 rotates clockwise in FIG. 9 against the force of the spring so that the hook-shape forward end portion of the lock member 74 is pulled out of the lock holes 61a, 62a, and 63a, of the rear leg 60, and the lock hole 80b of the support member 80. As a result, the connection between the upper end portion of the support member 80 and the rear leg 60 is canceled.

Next, an operation for switching the seat from the use condition to the retracted condition will be described with reference to, in particular, FIGS. 11(A) to 16(B). Further, it is noted that the motion of the cushion frame 12 and the back frame 22 is substituted for the motion of the seat cushion 10 and the seat back 20.

When the seat is in the use condition shown in FIG. 11(A) and 11(B), the front legs 40 and the rear legs 60 rise up substantially vertically, so that the cushion frame 12 is substantially horizontally supported. At this time, the operating member 58 of the driving means 50, that may tilt the front legs 40, is most retracted as shown in FIG. 11(B) or FIGS. 2 and 3. As a result, the connection pin 58b, that connects the connection member 58a and the connection arm 42a, is positioned on a forwardmost position (a leftmost position in the drawing). Further, the hook 58a-1, of the forward end of the connection member 58a, engages the engagement member 48 at a position rearward of the connection pin 58b (a right side in the drawing).

As shown in FIG. 11(B), when the seat is in the use condition, the front legs 40 and the operating member 58 (the connection member 58a) are interconnected at a first connecting portion C1 and a second connecting portion C2. The first connecting portion C1 is formed by the connection pin 58b. The second connecting portion C2 is formed by the hook 58a-1 and the engagement member 48 that are engaged with each other. Further, the front legs 40 and the connection arm 42*a* are supported on the floor F by a third connecting portion C3. The third connecting portion C3 is formed by the lower supporting member 42. Thus, the front legs 40, the connection arm 42*a*, and the connection member 58*a*, may preferably form a three-joint link.

In the use condition shown in FIGS. 11(A) and 11(B), when a switch for a seat retracting operation (not shown) is operated, the motor 32 of the driving means 30 is initially actuated. When the motor 32 is actuated, the reclining devices 26 are driven so that the back frame 22 (seat back 20) begins to tilt forwardly as shown in FIG. 12(A). When the back frame 22 is tilted, the connection brackets 24*a* of the upper arms 24 rotate around axes of the reclining devices 26, so that the right and left inner cables 79*b* are pulled. When the back frame 22 is tilted to a condition shown in FIGS. 12(A) and 12(B), the connection (lock) between the support members 80 and the rear legs 60 due to the right and left lock mechanisms G1 is canceled.

After the connection between the support members 80 and the rear legs 60 by the lock mechanisms G1 has been canceled, the motor 52 of the driving means 50 is driven. When the motor 52 is driven, the operating member 58 is pushed out from the differential mechanism 54, so that the lower supporting member 42 of the front legs 40 is rotated around the axis contained in the bearing bracket 44, via the connection member 58*a* and the connection arm 42*a*. As a result, the front legs 40 are tilted backwardly, as shown in FIGS. 13(A) and 13(B). As best shown in FIG. 13(B), after the operating member 58 starts to be pushed to the right or rear, the hook 58*a*-1 of the connection member 58*a* is disengaged from the engagement member 48 of the front legs 40, thereby allowing the front legs 40 to tilt.

When the front legs 40 are tilted backwardly, the link mechanism including the front legs 40 is operated. As a result, the cushion frame 12 is lowered toward the floor F, and the rear legs 60 are also tilted backwardly. At this time, as shown in FIG. 13(A), the support members 80 folded down toward the floor F while sliding relative to the rear legs 60. Further, in synchronism with an operation of the link mechanism and the support members 80, the back frame 22 is continuously tilted.

In the condition shown in FIGS. 14(A) and 14(B), a tilting operation of the rear legs 60 and the support members 80 is completed, so that the rear legs 60 and the support members 80 folded down onto the floor F. Further, a tilting operation of the back frame 22 is also completed and the motor 32 of the driving means 30 is stopped. However, a tilting operation of the front legs 40 is not yet completed, and a front side of the seat (the cushion frame 12) has not completely folded down onto the floor F. As will be apparent from FIG. 14(B), after the rear legs 60 start to be inclined (FIG. 13(A)), each of the lower hinge pins 66 is positioned in the forwardmost position within the elongated hole 64*a* of the bearing bracket 64.

Thus, in the condition shown in FIGS. 14(A) and 14(B), the tilting operation of the rear legs 60 that constitute a part of the link mechanism has been completed. Therefore, in order to further fold down the front legs 40, it is necessary to shift the cushion frame 12 backwardly. To this end, as shown in FIG. 15(A), when the front legs 40 are further tilted, as shown in FIG. 15(B), the hinge pins 66 of the rear legs 60 move backwardly within the elongated holes 64*a*.

As shown in FIGS. 16(A) and 16(B), when the front legs 40 have completely folded down, the motor 52 of the driving means 50 is stopped. At this time, the positions of the upper supporting portions 46 (hinge pins 47) of the front legs 40 have been displaced forwardly than their positions as shown in FIG. 15(A). Therefore, as shown in FIG. 16(B), the hinge pins 66 of the rear legs 60 are brought back to the forwardmost positions within the elongated holes 64*a*. In the condition shown in FIGS. 16(A) and 16(B), the cushion frame 12 has folded down to be substantially parallel to the surface of the floor F, so that the seat becomes placed into the retracted condition. Further, because the driving means 30 and 50 are stopped, the seat may preferably be maintained in the retracted condition.

In order to switch the seat from the retracted condition, shown in FIGS. 16(A) and 16(B), to the use condition shown in FIGS. 11(A) and 11(B), a switch (not shown) is operated such that the motors 32 and 52 of the driving means 30 and 50 are actuated reversely. When the seat rises up to the position as shown in FIGS. 12(A) and 12(B), the lock portion 80*c* of each of the support members 80 engages the guide pin 62*b*, and the lock holes 61*a*, 62*a*, and 63*a*, of the rear legs 60 are aligned with the lock hole 80*b* of the support member 80.

Thereafter, when the back frame 22 rotates to the position as shown in FIGS. 11(A) and 11(B), the pulling force applied on the right and left inner cables 79*b* is canceled. As a result, the support members 80 and the rear legs 60 are connected (locked) together again by the right and left lock mechanisms G1 so that the seat is returned to the use condition. Further, when the seat is returned to the use condition, the lower end portions of the rear legs 60 contact the stoppers 68 and are pushed backwardly. As a result, the hinge pins 66 are positioned in the rearmost positions in the elongated holes 64*a* of the bearing brackets 64 (FIG. 8). This position of the hinge pins 66 is maintained until the rear legs 60 is tilted backwardly again.

In the condition shown in FIGS. 11(A) and 11(B), the motors 32 and 52 of the driving means 30 and 50 are respectively stopped. Further, the hook 58*a*-1 of the connection member 58*a* of the driving means 50 engages the engagement member 48 of the front legs 40 again during a transition between the condition shown in FIGS. 13(A) and 13(B) and the condition shown in FIGS. 12(A) and 12(B). When the seat is in the use condition, one end portion of each of the support members 80 is connected to each of the right and left rear legs 60 by means of the lock mechanism G1. The connecting position substantially corresponds to an intermediate position between the upper and lower support points (hinge pins 70 and 66) of each of the right and left rear legs 60. Therefore, when the seat is in the use condition, the rear legs 60 may preferably be supported on the floor F by means of the support members 80. As a result, the retractable seat thus constructed may preferably have an increased support strength in the use condition. Thus, the seat can be reliably supported even when an excessive load is applied thereto.

Further, as will be apparent from FIGS. 2 and 3, when the seat is in the use condition, the support members 80 are positioned behind the rear legs 60 and are obliquely arranged relative to the rear legs 60 and the floor F. Also, the support members 80 are substantially aligned with the direction of a load that is applied to the seat through a seat belt, for example, at the time of a frontal collision of a vehicle. As a result, the support strength for the seat at the time of the frontal collision of the vehicle is further enhanced. However, generally speaking, even if the bearing brackets 82 and the hinge pins 84 of the support members 80 are arranged obliquely with respect to the floor F in front of the rear legs 60 (under the seat cushion 10), sufficient support strength can be obtained.

Regarding the lock mechanisms G1, the lock members 74 are urged by the springs 76 in the direction that the rear legs 60 and the support members 80 are interconnected (locked). When the back frame 22 is tilted with respect to the cushion frame 12, the lock members 74 are automatically pulled out of the lock holes 61a, 62a, and 63a, of the rear legs 60 and the lock holes 80b of the support members 80, thereby unlocking the lock mechanisms G1. Thus, in order to lock or unlock the lock mechanisms G1, there is no need to use a special purpose motor or the like for operating the lock members 74. Further, the lock members 74 rotate around the axes of the hinge pins 78 arranged inside of the rear legs 60 and extending along the longitudinal direction of the seat. Therefore, it is possible to reduce the mounting space for the lock mechanisms G1 and the moving space of the lock members 74. Moreover, it possible to reduce the thickness of the seat in the retracted condition.

Figure 17:
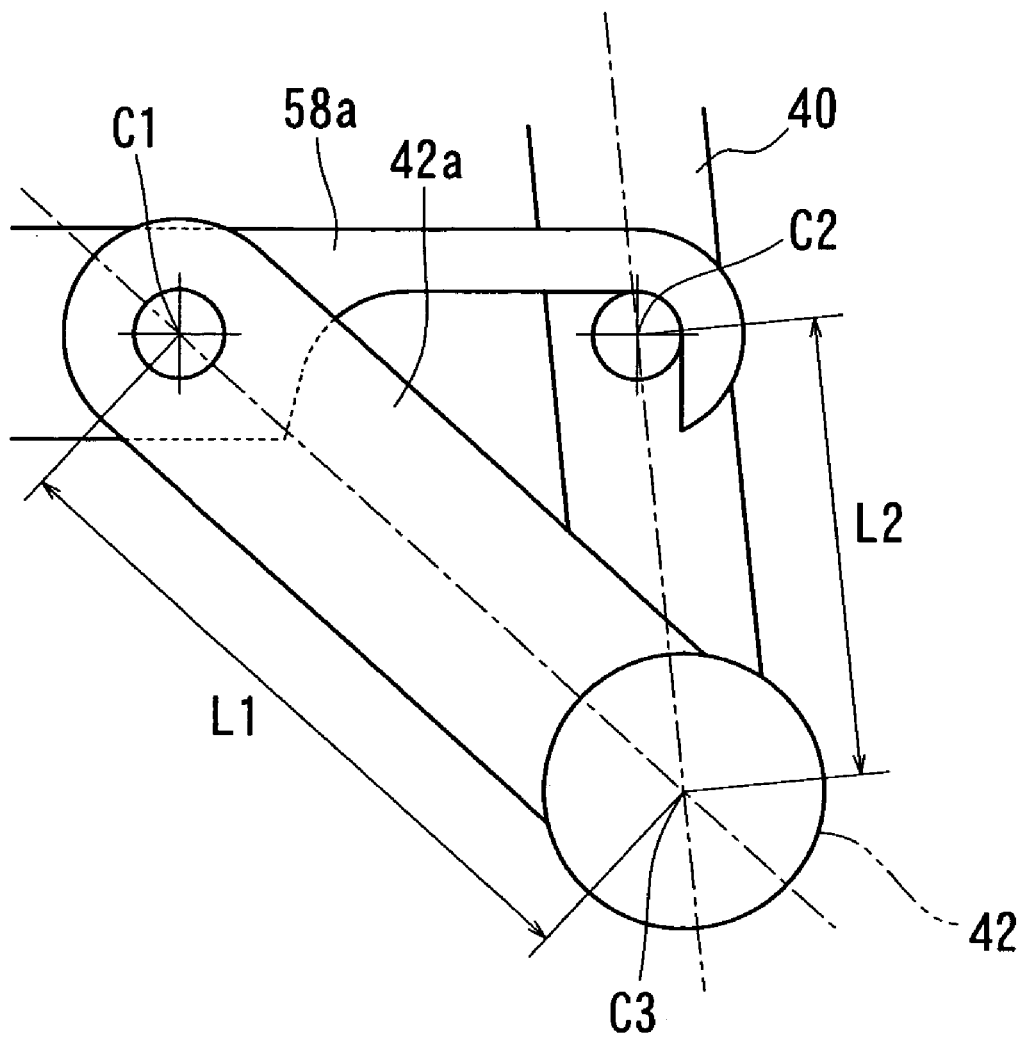
FIG. 17 is a schematic view of a three-joint link of a front leg.

As shown in FIG. 17, a distance L1 between the first connecting portion C1 and the support portion C3, which corresponds to a rotating radius of the first connecting portion C1, is determined to be greater than a distance L2 between the connecting portion C2 and the support portion C3, which corresponds to a rotating radius of the second connecting portion C2. Therefore, when the seat is returned to the use condition from the retracted condition, a leftward moving distance of the first connecting portion C1 is greater than a leftward moving distance of the second connecting portion C2. As a result, the second connecting portion C2 is pulled leftwardly via the connection member 58a by a moving distance in excess of the first connecting portion C1. Due to this pulling force, when the seat is in the use condition, the front legs 40 are biased forwardly so as to be prevented from tilting rearwardly. Therefore, the front legs 40 may preferably be inhibited from rattling.

The operating member 58 of the driving means 50 in this embodiment comprises a screw rod. Therefore, in either the use condition or the retracted condition of the seat, the operating member 58 provides a locking function when the motor 52 is stopped. In particular, when the seat is in the use condition, the three-joint link of the front legs 40 may be relatively rigid. As a result, the seat is reliably retained regardless of types of load that is applied thereto.

Second Detailed Representative Embodiment

The second detailed representative embodiment will now described with reference to FIG. 18.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

Figure 18:
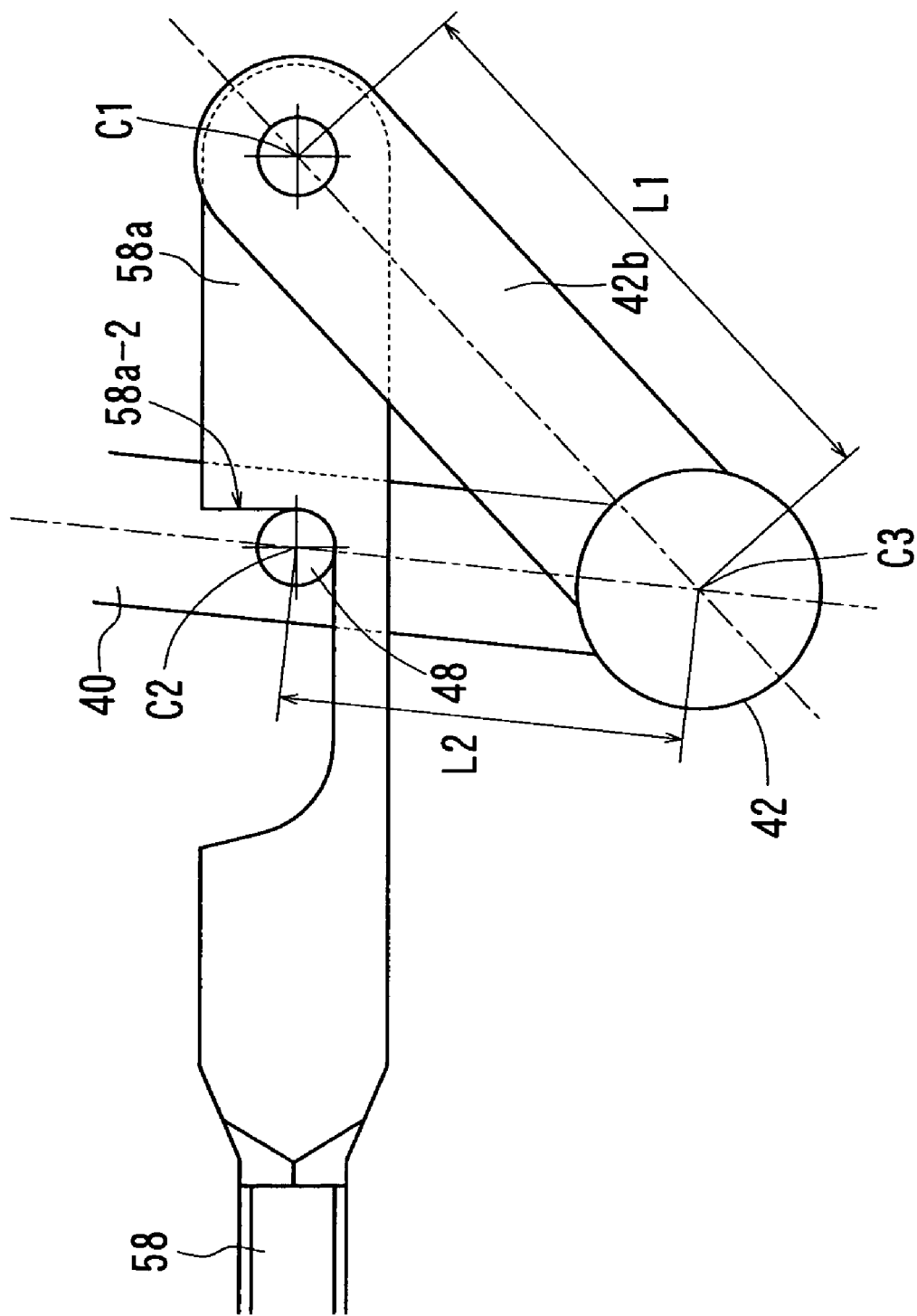
FIG. 18 is a schematic view of a three-joint link of a front leg according to a second embodiment of the present invention.

As shown in FIG. 18, in this embodiment the first connecting portion C1 is formed by a connecting portion of an end portion of a connection arm 42b and a forward end of the connection member 58a. As will be recognized, the connection arm 42b is fixed to the lower supporting member 42 of the front legs 40 and is inclined backwardly. Further, the second connecting portion C2 is formed by an engagement portion of the engagement member 48 of the front legs 40 and a hook 58a-2. In such a three-joint link thus formed, the leftward moving distance of the first connecting portion C1 is greater than the leftward moving distance of the second connecting portion C2, because there is a substantial difference between the distances L1 and L2. As a result, it is possible to obtain many of the same functions as the first embodiment, including but not limited to inhibiting rattles and providing a relatively rigid structure.

Third Detailed Representative Embodiment

The third detailed representative embodiment will now described with reference to FIGS. 19 to 23.

Because the third embodiment relates to both the first and second embodiments, only the constructions and elements that are different from either the first and second embodiments will be explained in detail. Elements that are the same in the first to third embodiments will be identified by the same reference numerals and a detailed description of such elements may be omitted.

Figure 19:
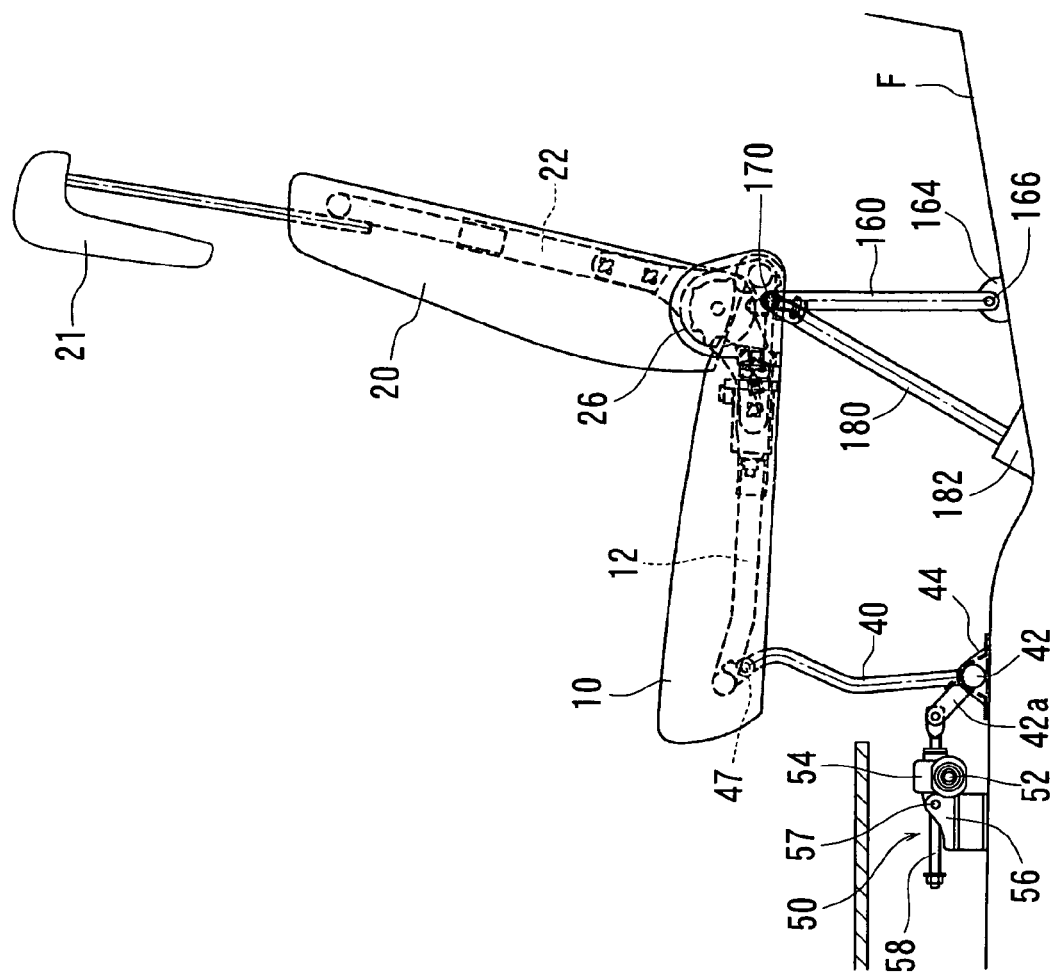
FIG. 19 is a side view of a retractable vehicle seat according to a third embodiment of the present invention.
Figure 20:
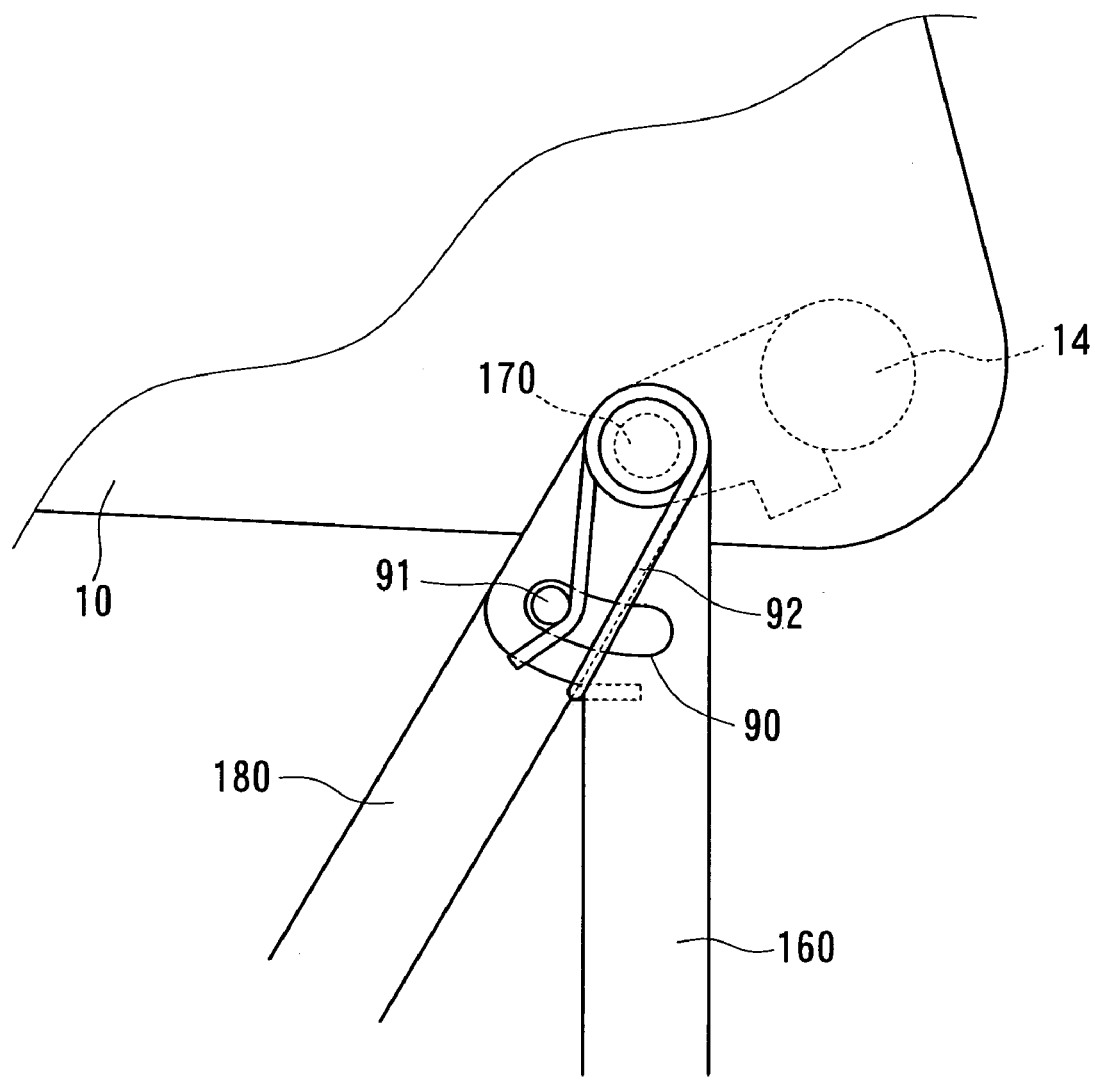
FIG. 20 is an enlarged side view of FIG. 19.

As shown in FIGS. 19 and 20, the seat cushion 10 is supported on the floor F by a pair of front legs 40 and a pair of rear legs 160. Similar to the first embodiment, the connection member 58a of the operating member 58 of the driving means 50 is connected to the connection arm 42a, fixed to the lower supporting member 42 of the front legs 40 via the connection pin 58b. However, unlike the first embodiment, the hooks 58a-1 and 58a-2 of the connection member 58a and the engagement member 48 of the front legs 40 are not used.

Lower end portions of the rear legs 160 are connected to bearing brackets 164 fixed to the floor F via hinge pins 166. Further, upper end portions of the rear legs 160 are connected to the cushion frame 12 via hinge pins 170. The right and left rear legs 160 are respectively supported from front sides thereof by support members 180 (i.e., restraint mechanism or support mechanism). That is, upper end portions of the support members 180 are rotatably connected to the hinge pins 170, and lower end portions of the support members 180 are connected to support blocks 182 mounted on the floor F. Therefore, similar to the first embodiment, when the seat is in the use condition shown in FIG. 19, the rear legs 160, the support members 180, and the floor F form a triangle.

As shown in FIG. 20, each of the support members 180 is provided with a pin 91 that is positioned adjacent to the hinge pin 170. On the other hand, each of the rear legs 160 has a guide hole 90 for receiving and guiding the pin 91 that is positioned adjacent to the hinge pin 170. The guide hole 90 extends along a circular arc that is centered with respect to an axis of the hinge pin 170. Therefore, the support member 180 may preferably rotate around the axis of the hinge pin 170 relative to the rear leg 160 within a restrictive range defined by the pin 91 and the guide hole 90. Further, a torsion spring 92 is provided between the hinge pin 170 and the pin 91. As will be appreciated, the torsion spring 92 functions to broaden an angle between the support member 180 and the rear leg 160. Therefore, in the normal condition, the support member 180 and the rear leg 60 are spread over a desired angle (FIG. 20).

Next, an operation for switching the seat from the use condition to the retracted condition will be described with reference to FIGS. 19 and 21 to 23. This embodiment does not require a means corresponding to the lock mechanisms G1 of the first embodiment. However, it is possible to use lock mechanisms (not shown) that can connect the lower end portions of the support members 180 to the support blocks 182, if necessary. In such a case, when the seat back 20, shown in the use condition in FIG. 19, is tilted forwardly, such lock mechanisms that interconnect (lock) the lower end portions of the support members 180 and the support blocks 182 can be released via cables or the like.

Figure 21:
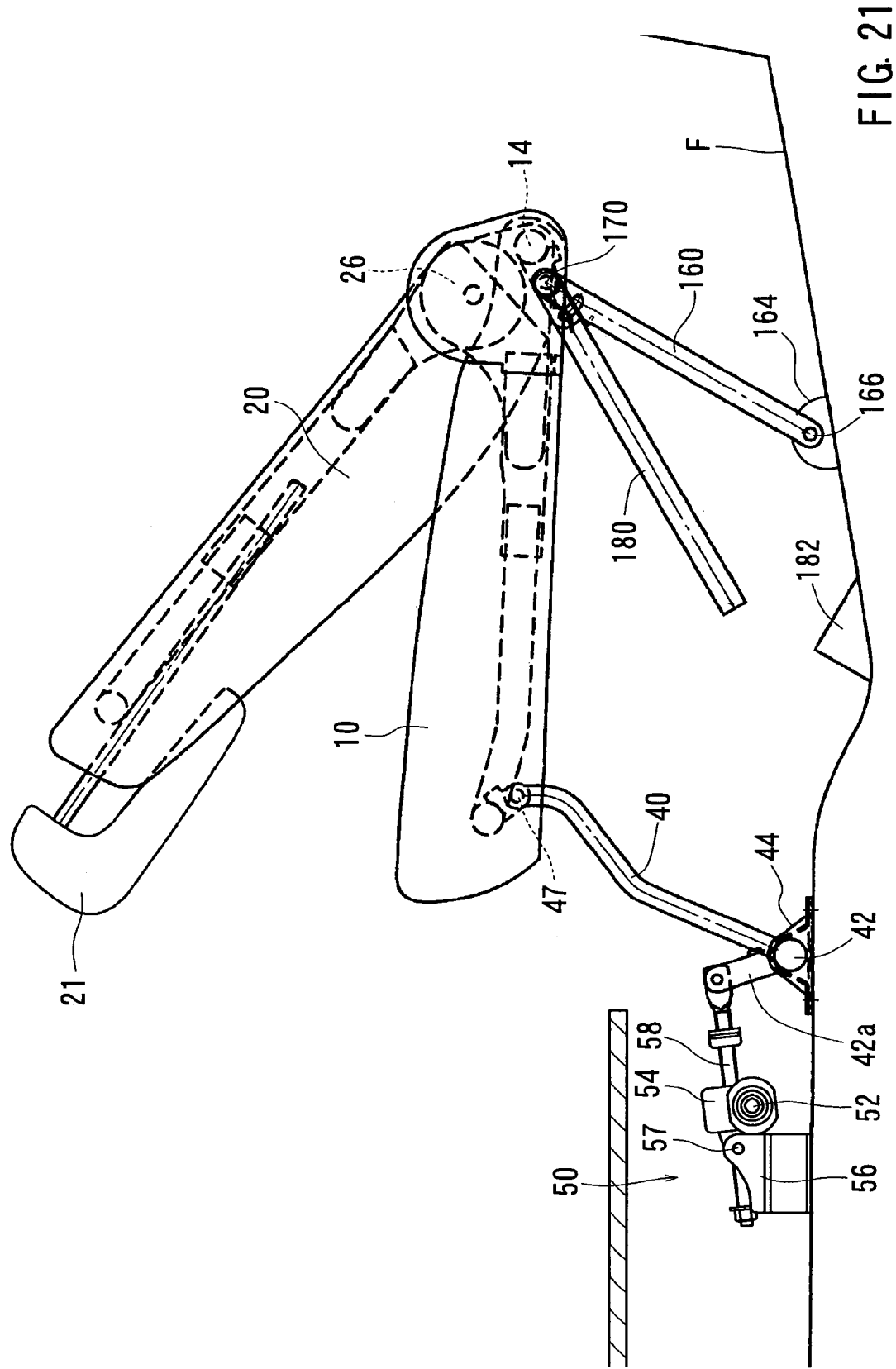
FIG. 21 is a side view of the seat similar to FIG. 13(A)
Figure 22:
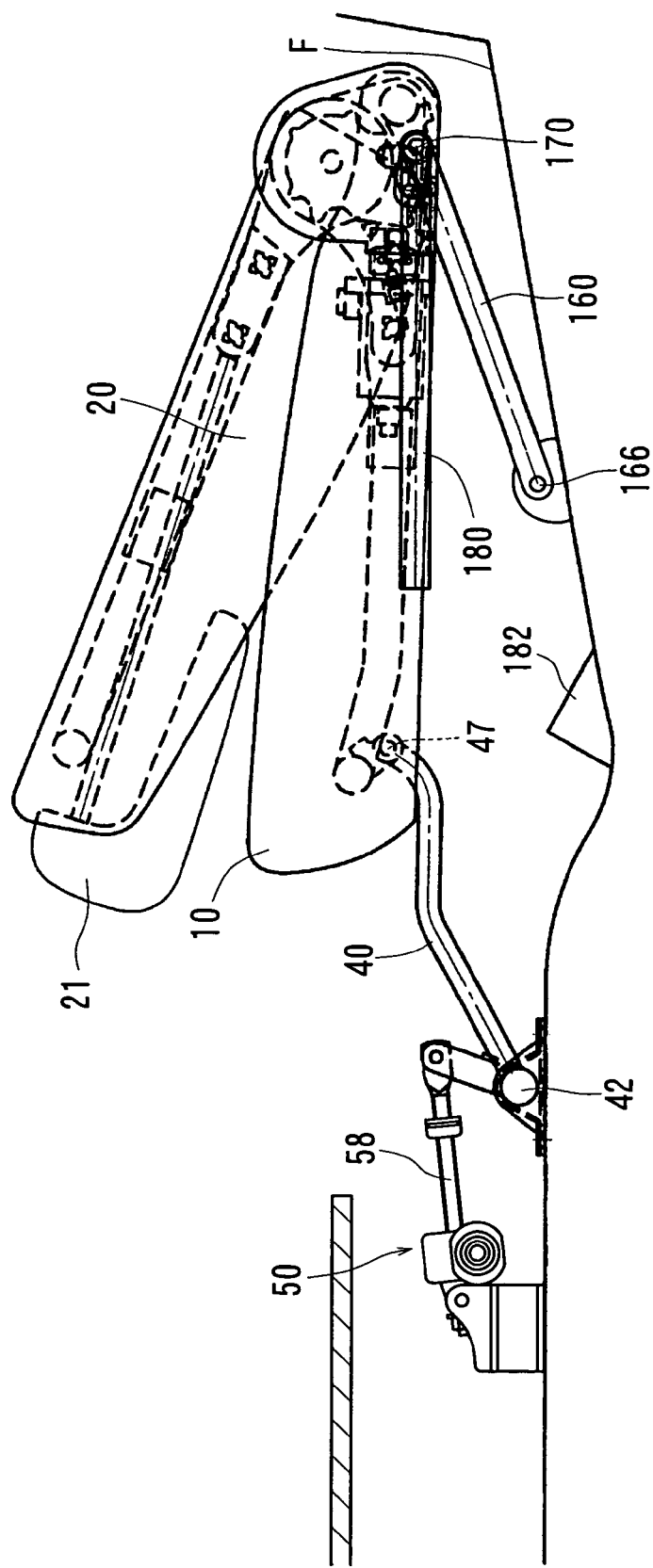
FIG. 22 is a side view of the seat similar to FIG. 15(A)
Figure 23:
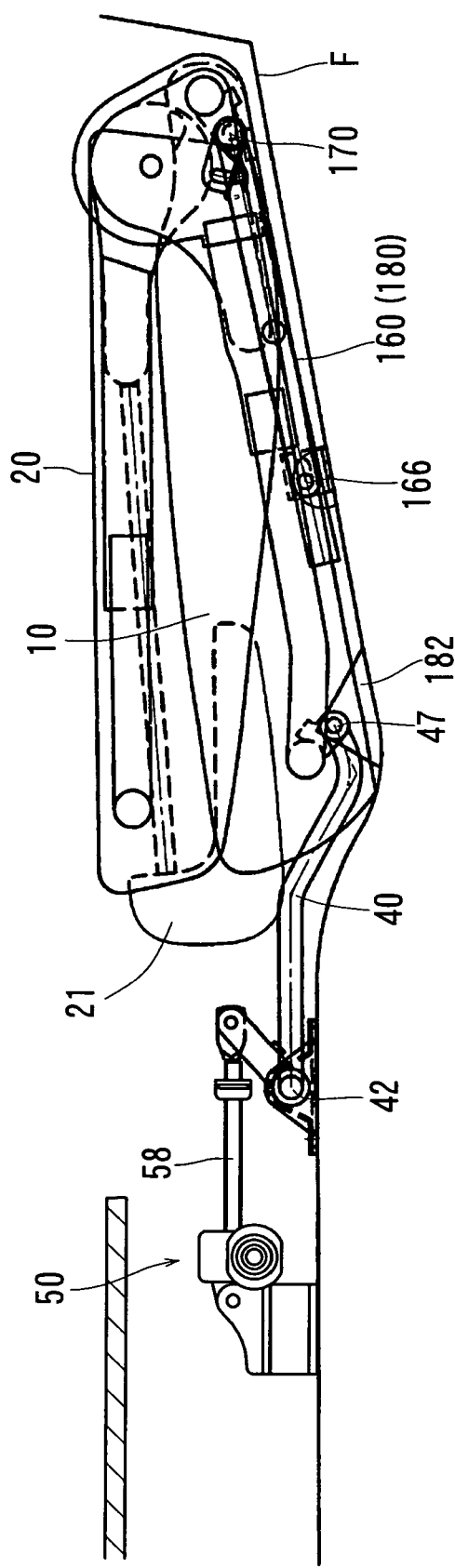
FIG. 23 is a side view of the seat similar to FIG. 16(A)

Thus, in the case in which lock mechanisms are utilized, the motor 52 of the driving means 50 is driven after canceling the lock of the lock mechanisms. When the motor 52 is driven, the operating member 58 of the driving means 50 is moved rearwardly and as a result, the front legs 40 and the rear legs 160 forming the link mechanism may preferably be tilted backwardly, as shown in FIG. 21. When the link mechanism is thus operated, the lower end portions of the support members 180 are separated from the support blocks 182. When the operating member 58 is further pushed out, as shown in FIG. 22, the seat cushion 10 is lowered toward the floor F, so that the support members 180 extend along the lower surface of the seat cushion 10. As shown in FIG. 23, when the front legs 40 and the rear legs 160 have completely folded down, the motor 52 of the driving means 50 is stopped. At this time, the support members 180 rotate around the axes of the hinge pins 170 against the force of the springs 92 and are superimposed on the rear legs 160. In a condition shown in FIG. 23, the seat cushion 10 is substantially parallel to the surface of the floor F, so that the seat is in a retracted condition. Further, because the driving means 50 is stopped, the seat may preferably be maintained in the retracted condition.

When the seat is returned from the retracted condition to the use condition, the support members 180 and the rear leg 160 are spread over the desired angle due to the force of the springs 92 (FIG. 21). Therefore, when the seat is returned to the use condition (FIG. 19), the lower end portions of the support members 180 are again supported by the support blocks 182, so that the rear legs 160, the support members 180, and the floor F, again substantially form a triangle. Thus, the support members 180 may preferably support the rear legs 160 from the front sides thereof. Therefore, when the seat is in the use condition, the seat exhibits high support strength against a load, in particular, a load applied from a rear side thereof. When the seat is in the use condition, because the driving means 50 is stopped, the use condition of the seat may reliably be maintained.

Fourth Detailed Representative Embodiment

The fourth detailed representative embodiment will now described with reference to FIGS. 24 to 28.

Because the fourth embodiment relates to the first to third embodiments, only the constructions and elements that are different from the first to third embodiments will be explained in detail. Elements that are the same in the first to fourth embodiments will be identified by the same reference numerals and a detailed description of such elements may be omitted.

Figure 24:
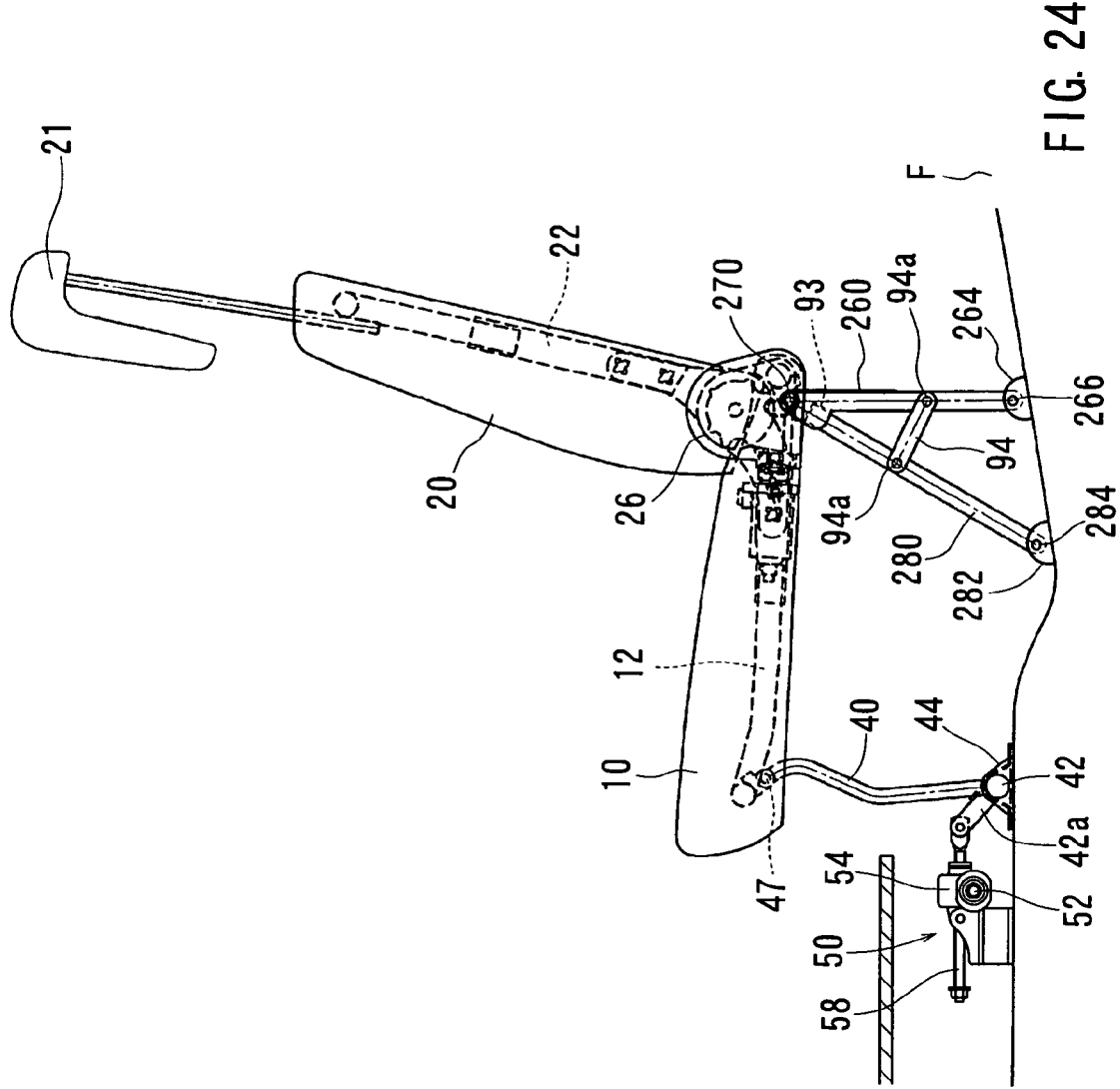
FIG. 24 is a side view of a retractable vehicle seat according to a fourth embodiment of the present invention.

As shown in FIG. 24, in this embodiment a lower end portion of each rear leg 260 is connected to a bearing bracket 264 fixed to the floor F via a hinge pin 266. An upper end portion of each of the rear legs 260 is connected to the cushion frame 12 via a hinge pin 270. Further, the rear legs 260 are supported from front sides thereof by means of support members 280 (i.e., restraint mechanism or support mechanism).

Figure 25:
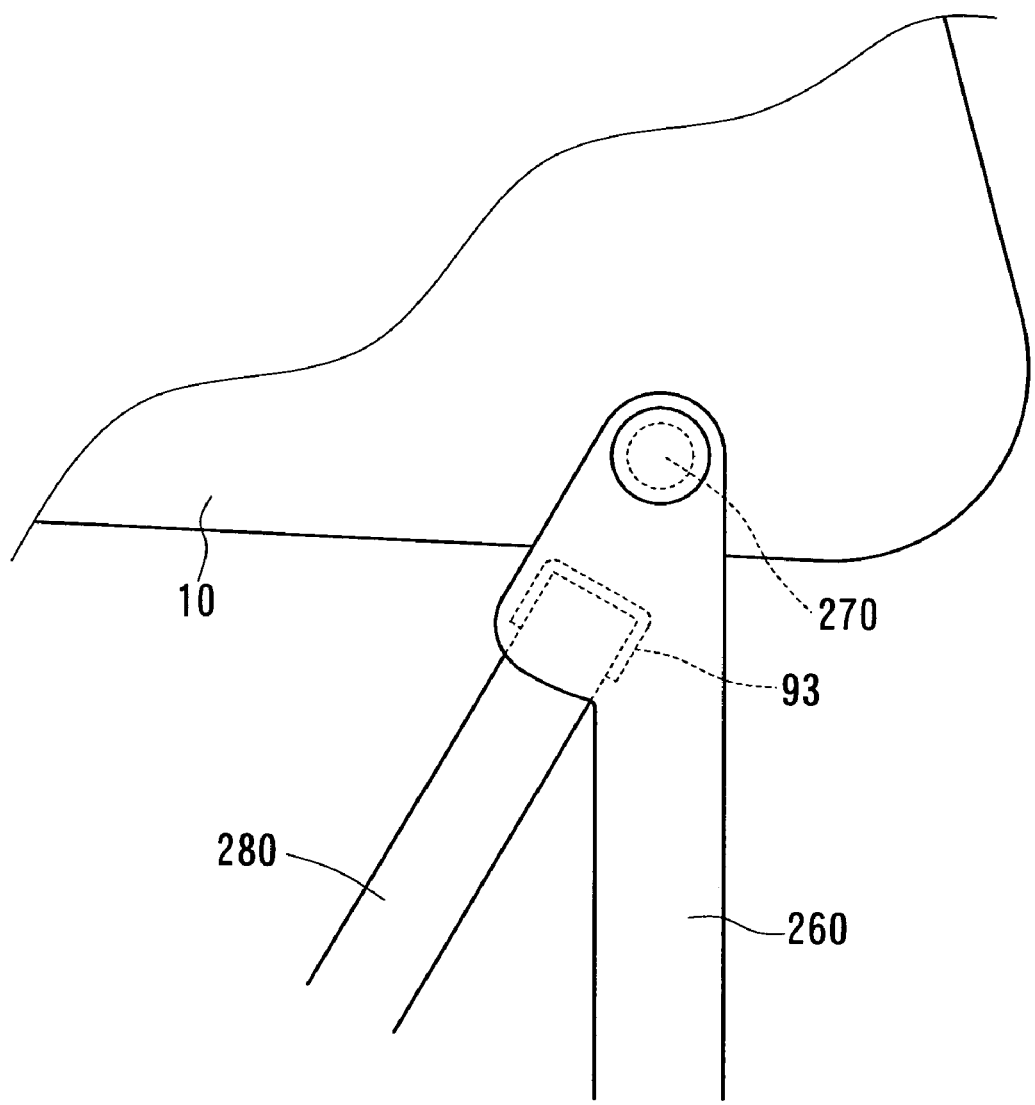
FIG. 25 is an enlarged side view of FIG. 24.

A lower end portion of each of the support members 280 is rotatably connected to the bearing bracket 282 fixed to the floor F via a hinge pin 284. An upper end portion of the support member 280 is supported by a support portion 93 that is fixed to the upper end portion of the rear leg 260 (FIG. 25). Further, intermediate operating links 94 are provided between the rear legs 260 and the support members 280. The end portions of each of the operating links 94 are respectively connected to the rear leg 260 and the support member 280 via pins 94a. When the seat is in the use condition shown in FIG. 24, the rear leg 260, the support member 280, and floor F, substantially form a triangle. Therefore, the seat exhibits high support strength when in the use condition. Further, because the driving means 50 is stopped, the seat may preferably be maintained in the use condition.

Figure 26:
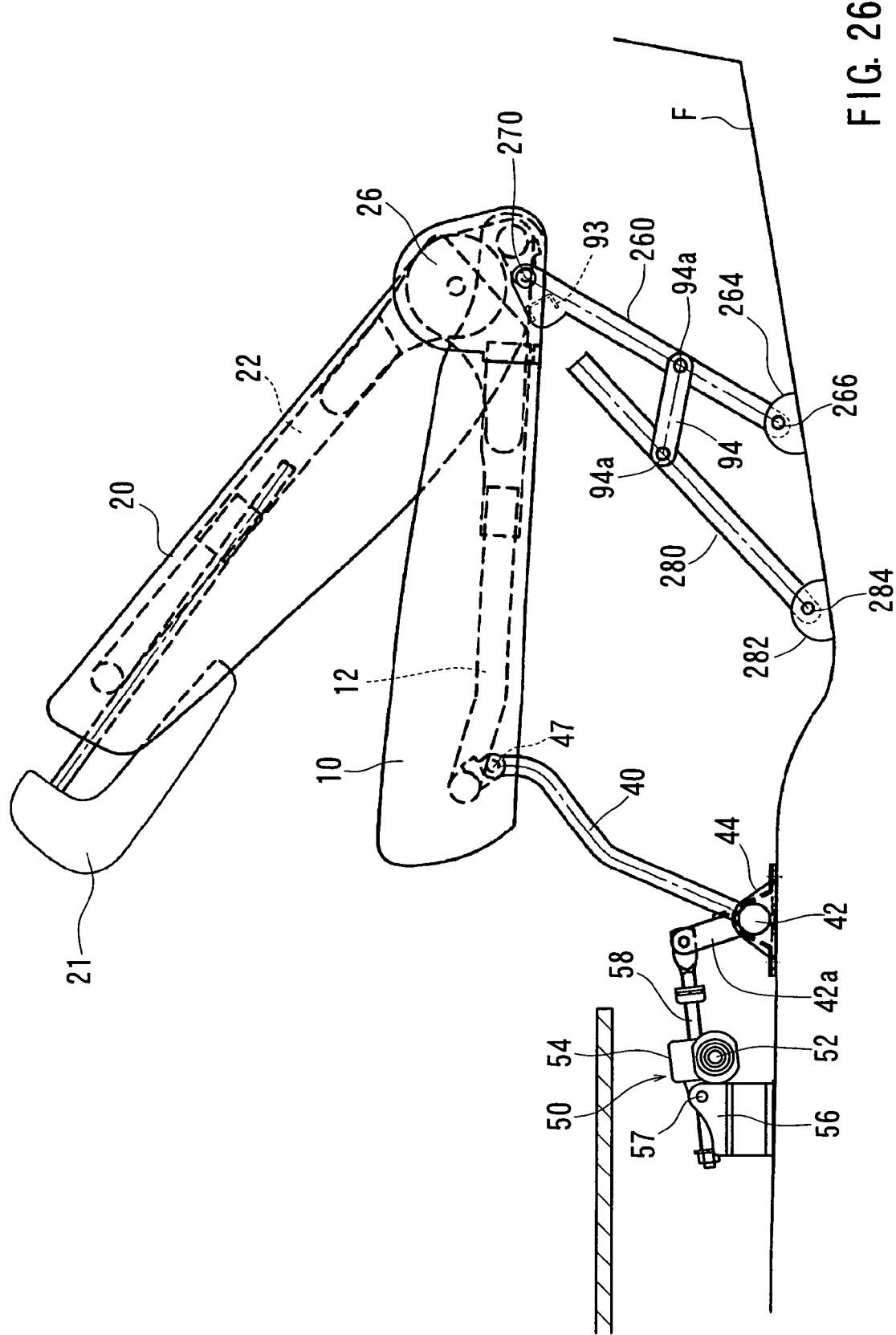
FIG. 26 is a side view of the seat similar to FIG. 13(A)
Figure 27:
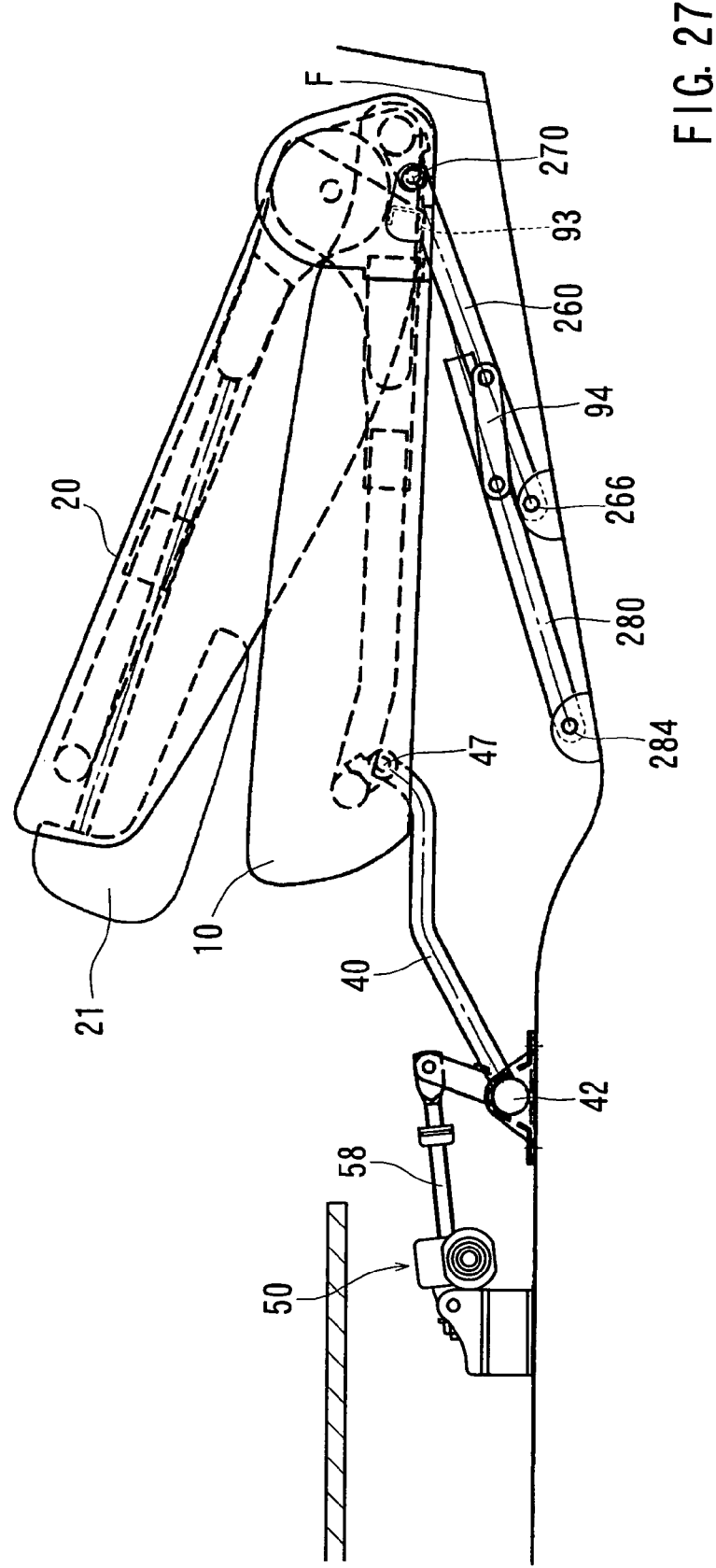
FIG. 27 is a side view of the seat similar to FIG. 15(A)
Figure 28:
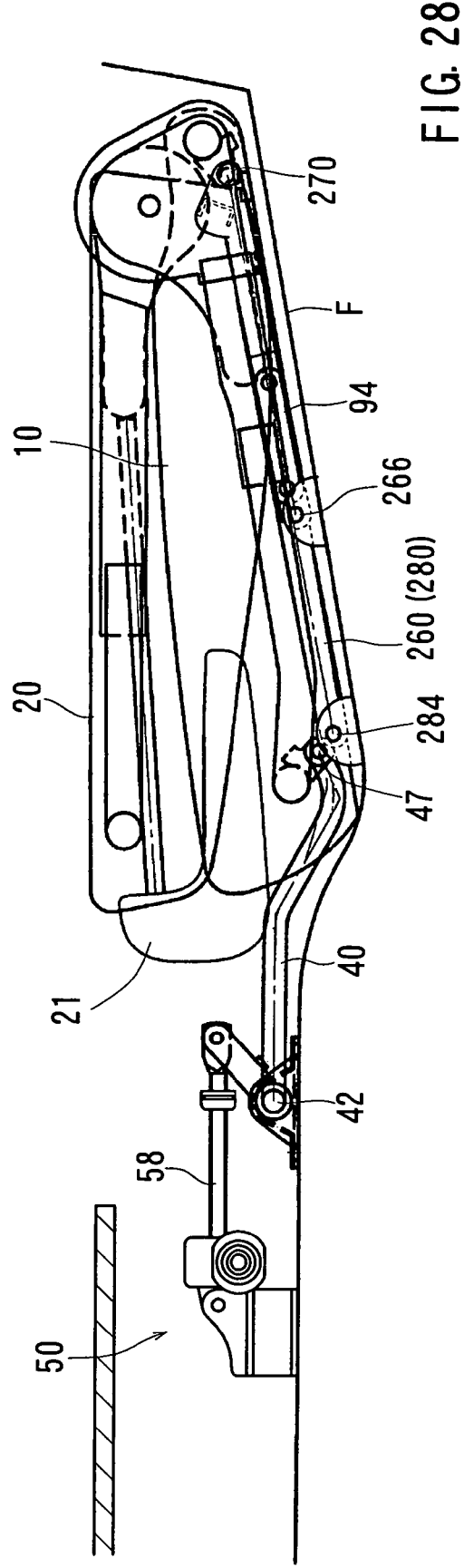
FIG. 28 is a side view of the seat similar to FIG. 16(A)

Next, an operation for switching the seat from the use condition to the retracted condition will be described with reference to FIGS. 24 and 26 to 28. When the motor 52 of the driving means 50 is started, the operating member 58 is pushed out toward the rear (right of FIG. 24). As a result, as shown in FIG. 26, the front legs 40 and the rear legs 260 forming a link mechanism are tilted backwardly. When the link mechanism is thus operated, the upper end portions of the support members 280 are separated from the support portions 93. Thereafter, the support members 280 are tilted backwardly together with the rear legs 260 by means of the operating links 94. As shown in FIG. 27, when the seat is in a condition immediately before the retracted condition, the support members 280 are substantially parallel to the rear legs 260. As shown in FIG. 28, when the seat is in the retracted condition, the support members 280 extend along the lower surface of the seat cushion 10 together with the rear legs 260. Further, because the driving means 50 is stopped, the seat may reliably be maintained in the retracted condition.

When the seat is returned from the retracted condition to the use condition, the support members 280 are moved together with the rear legs 260 by means of the operating links 94. Eventually, the upper end portions of the support members 280 are again supported by the support portions 93.

Fifth Detailed Representative Embodiment

The fifth detailed representative embodiment will now described with reference to FIGS. 29 to 32.

Because the fifth embodiment relates to the first embodiment, only the constructions and elements that are different from the first to fourth embodiments will be explained in detail. Elements that are the same in the first to fifth embodiments will be identified by the same reference numerals and a detailed description of such elements may be omitted.

Figure 29:
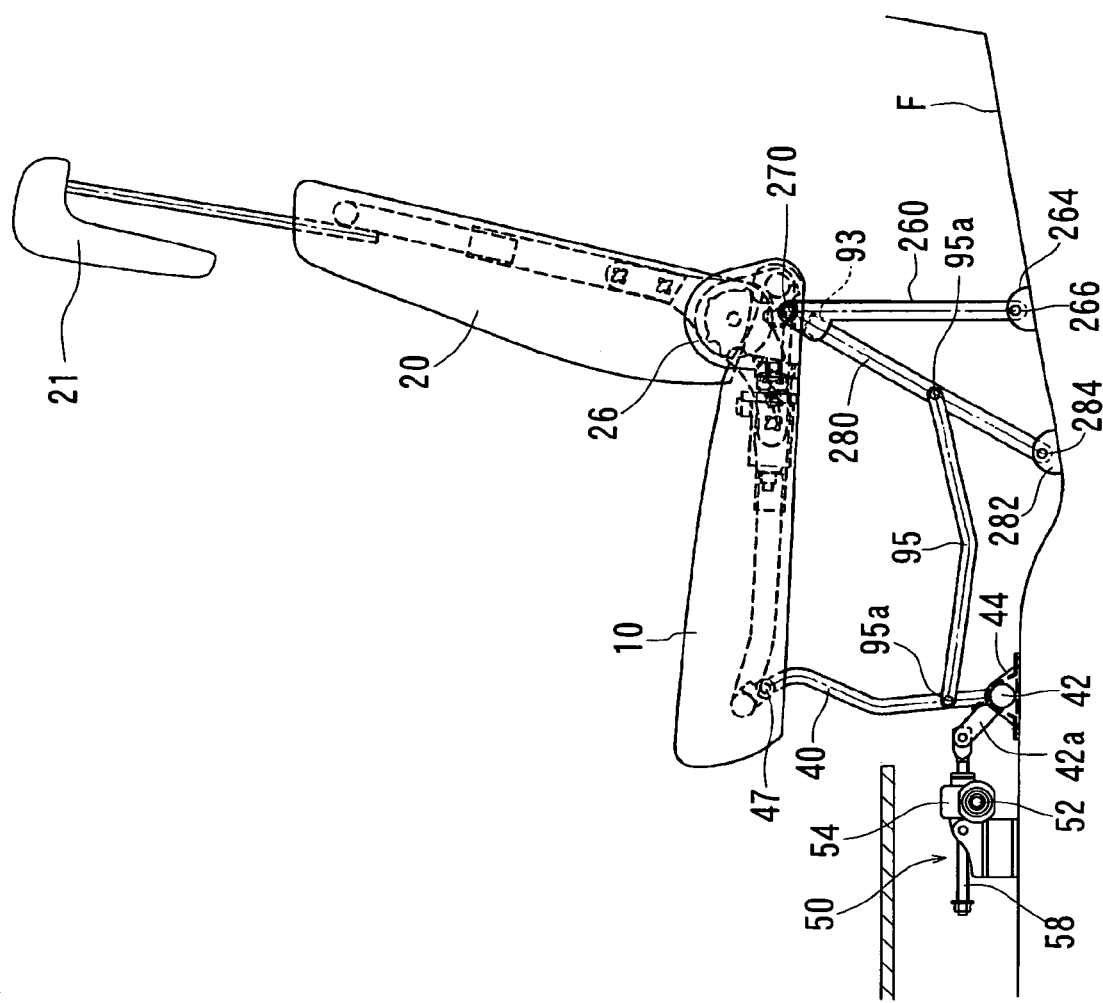
FIG. 29 is a side view of a retractable vehicle seat according to a fifth embodiment of the present invention.
Figure 30:
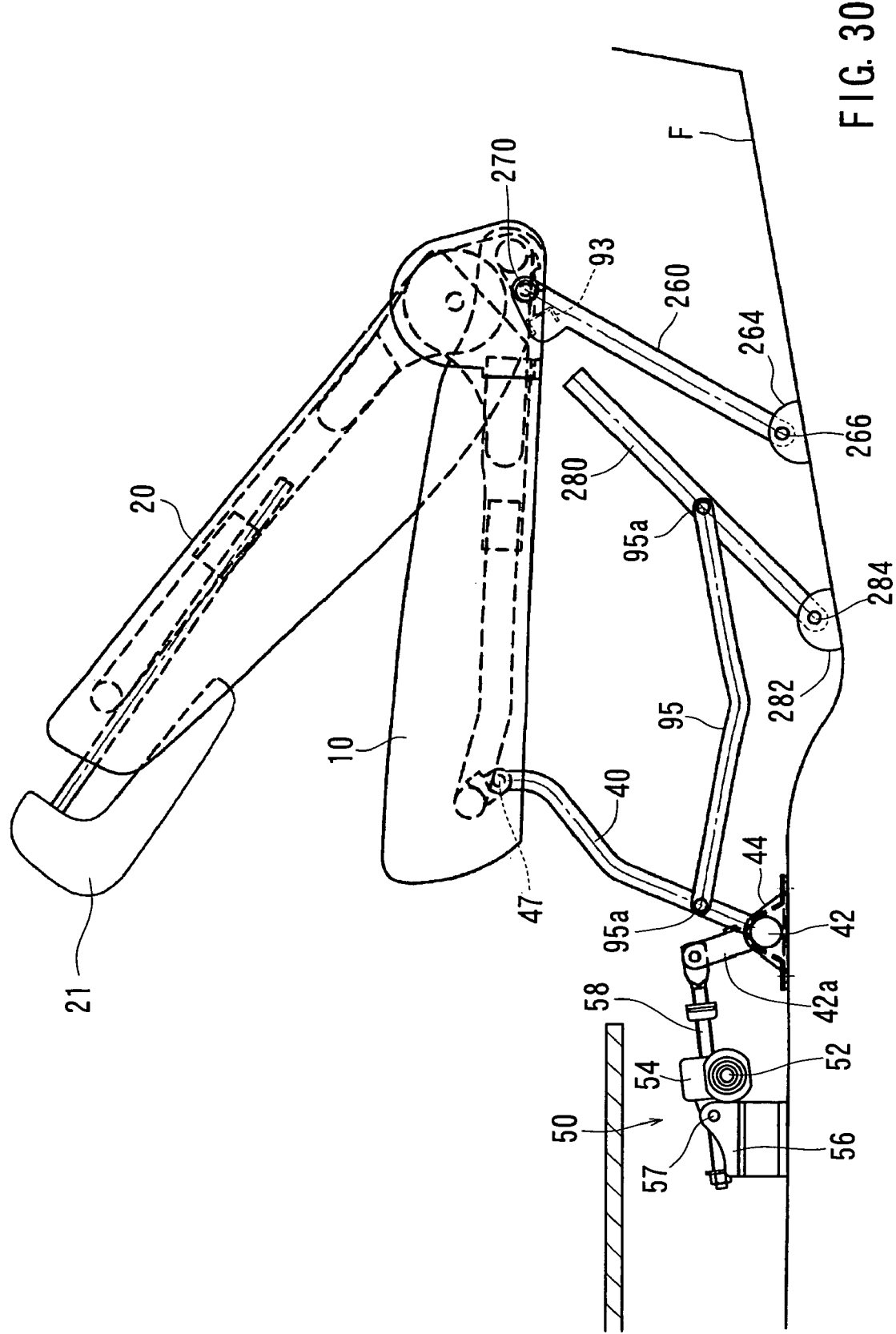
FIG. 30 is a side view of the seat similar to FIG. 13(A)
Figure 31:
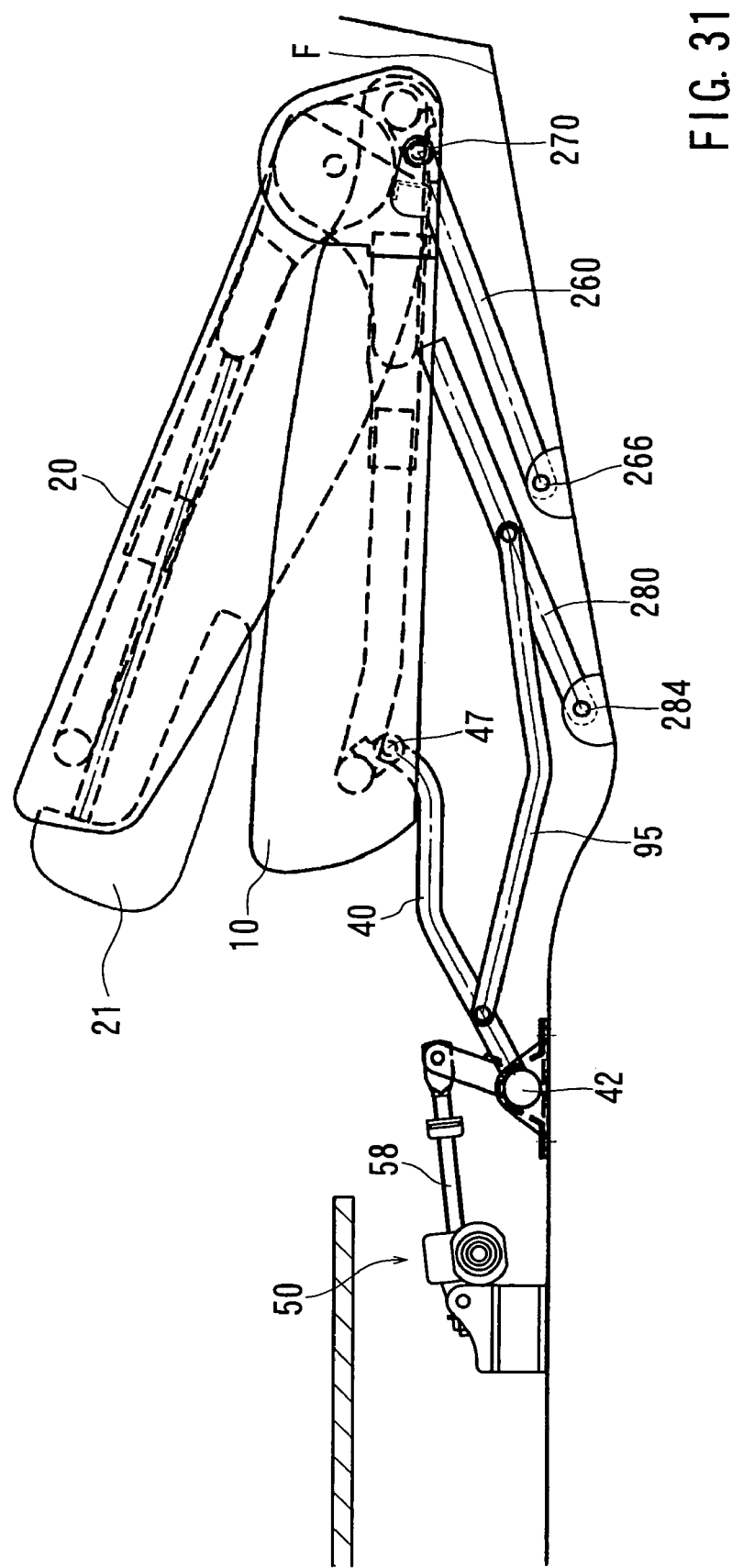
FIG. 31 is a side view of the seat similar to FIG. 15(A)
Figure 32:
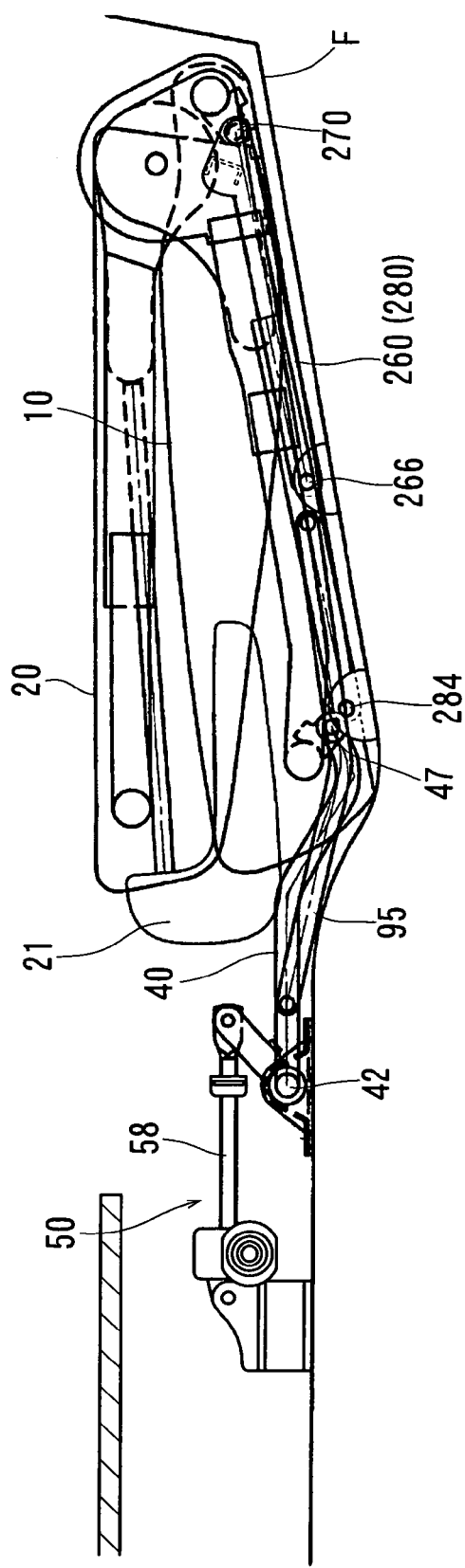
FIG. 32 is a side view of the seat similar to FIG. 16(A)

As shown in FIG. 29, this embodiment utilizes the rear legs 260 and the support members 280 that are similar to those used in the fourth embodiment. However, unlike the fourth embodiment, the front legs 40 and the support members 280 are interconnected by means of operating links 95. End portions of the operating links 95 are respectively connected to the front legs 40 and the support members 280 via pins 95a. When the seat is shifted from the use condition shown in FIG. 29 to the retracted condition shown in FIG. 32, or vice versa, the support members 280 are moved together with the front legs 40 by means of the operating links 95.

Sixth Detailed Representative Embodiment

The Sixth detailed representative embodiment will now described with reference to FIGS. 33 to 36.

Because the sixth embodiment relates to the first to fifth embodiments, only the constructions and elements that are different from the first to fifth embodiments will be explained in detail. Elements that are the same in the first to sixth embodiments will be identified by the same reference numerals and a detailed description of such elements may be omitted.

Figure 33:
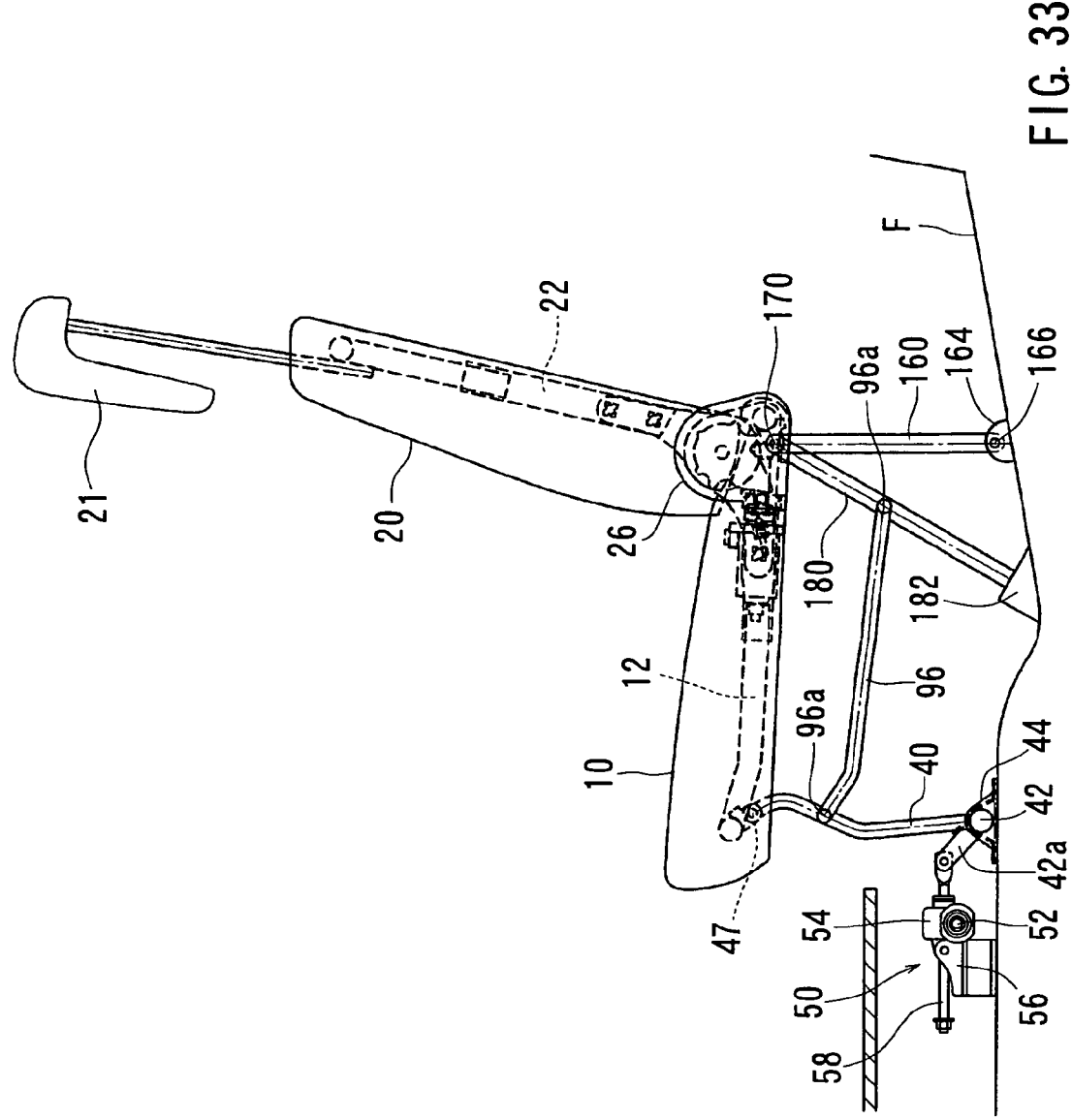
FIG. 33 is a side view of a retractable vehicle seat according to a sixth embodiment of the present invention.
Figure 34:
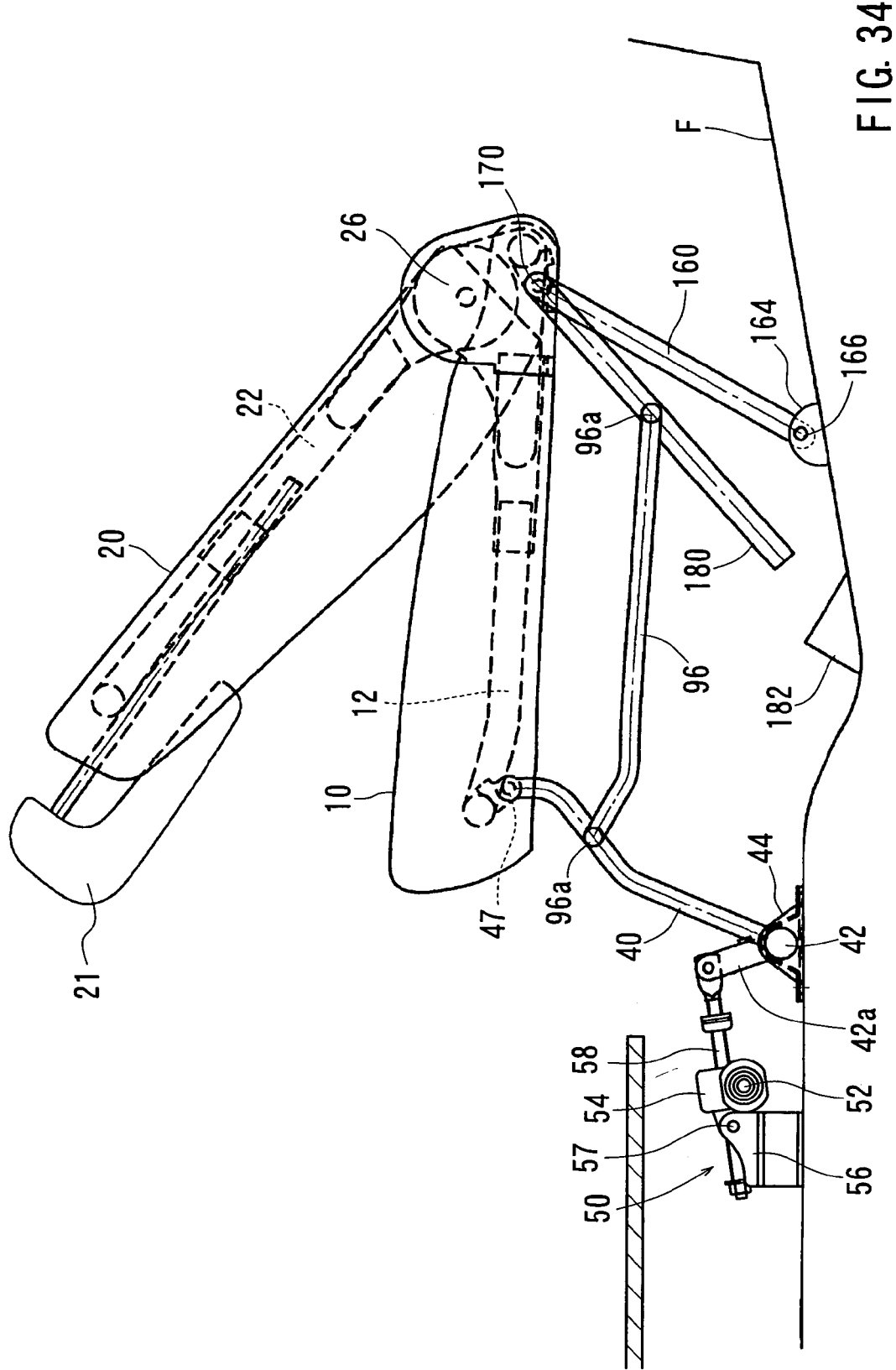
FIG. 34 is a side view of the seat similar to FIG. 13(A)
Figure 35:
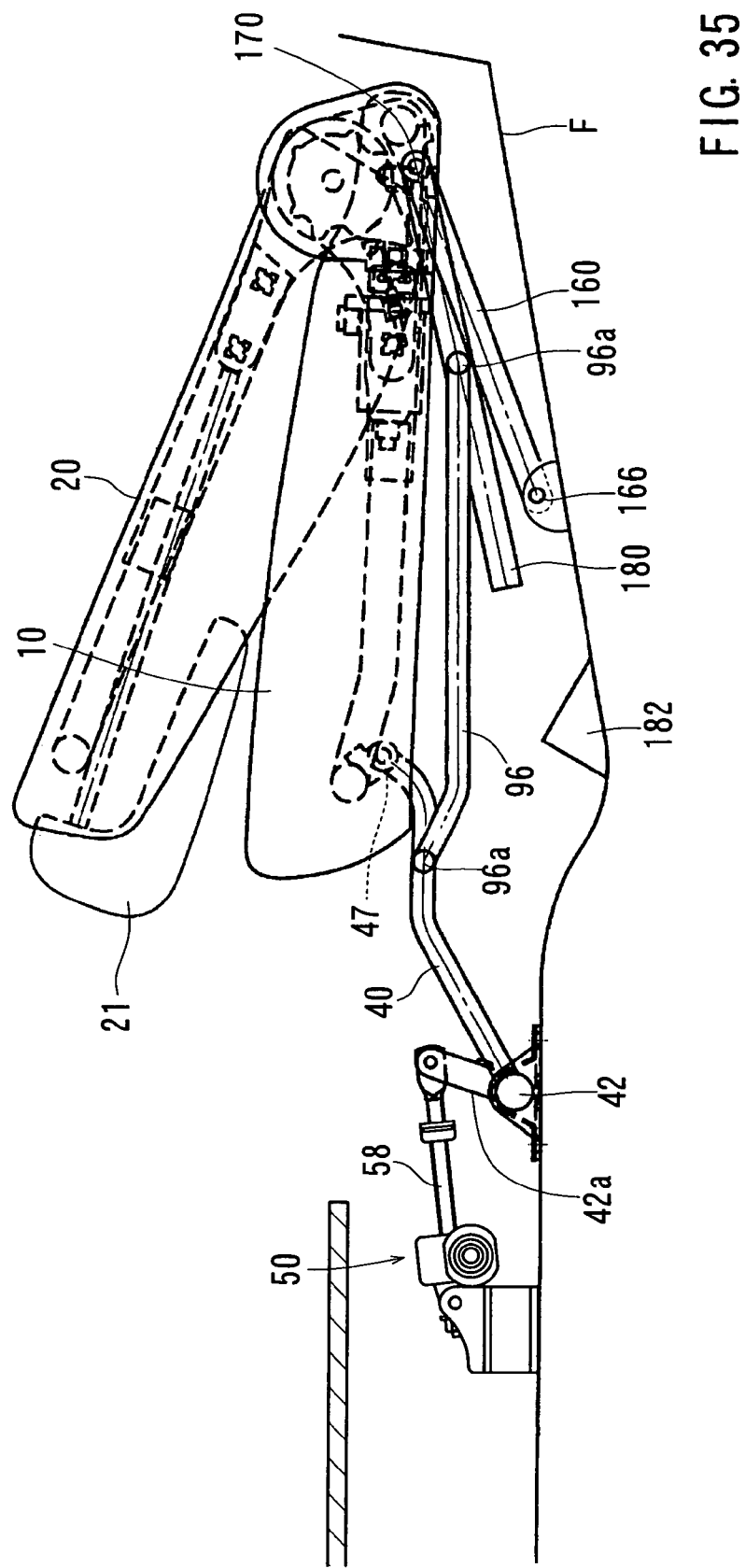
FIG. 35 is a side view of the seat similar to FIG. 15(A)
Figure 36:
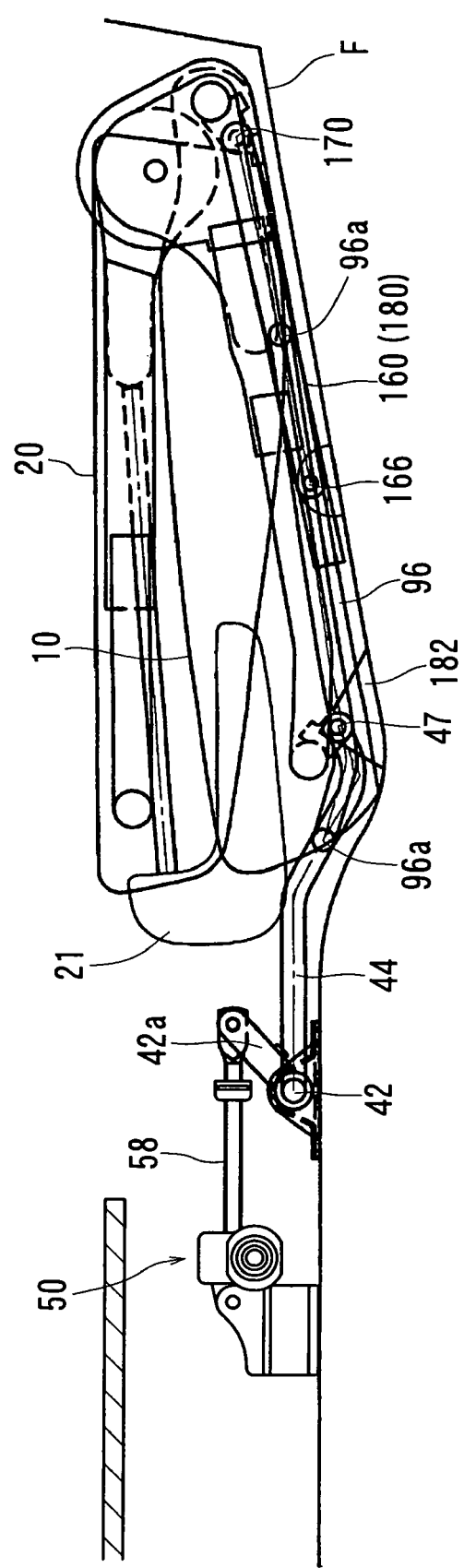
FIG. 36 is a side view of the seat similar to FIG. 16(A)

As shown in FIG. 33, this embodiment utilizes the rear legs 160 and the support members 180 that have substantially the same construction as those of the third embodiment. However, unlike the third embodiment, the guide holes 90 of the rear legs 160, the pins 91 of the support members 180, and the springs 92 are not used. Instead, the front legs 40 and the support members 180 are interconnected by means of operation links 96. End portions of the operation links 96 are respectively connected to the front legs 40 and the support members 180 via pins 96a. When the seat is moved from the use condition shown in FIG. 33 to the retracted condition shown in FIG. 36, or vice versa, the support members 180 are operated in the same manner as in the third embodiment by means of the operation links 96.

Seventh Detailed Representative Embodiment

Figure 38:
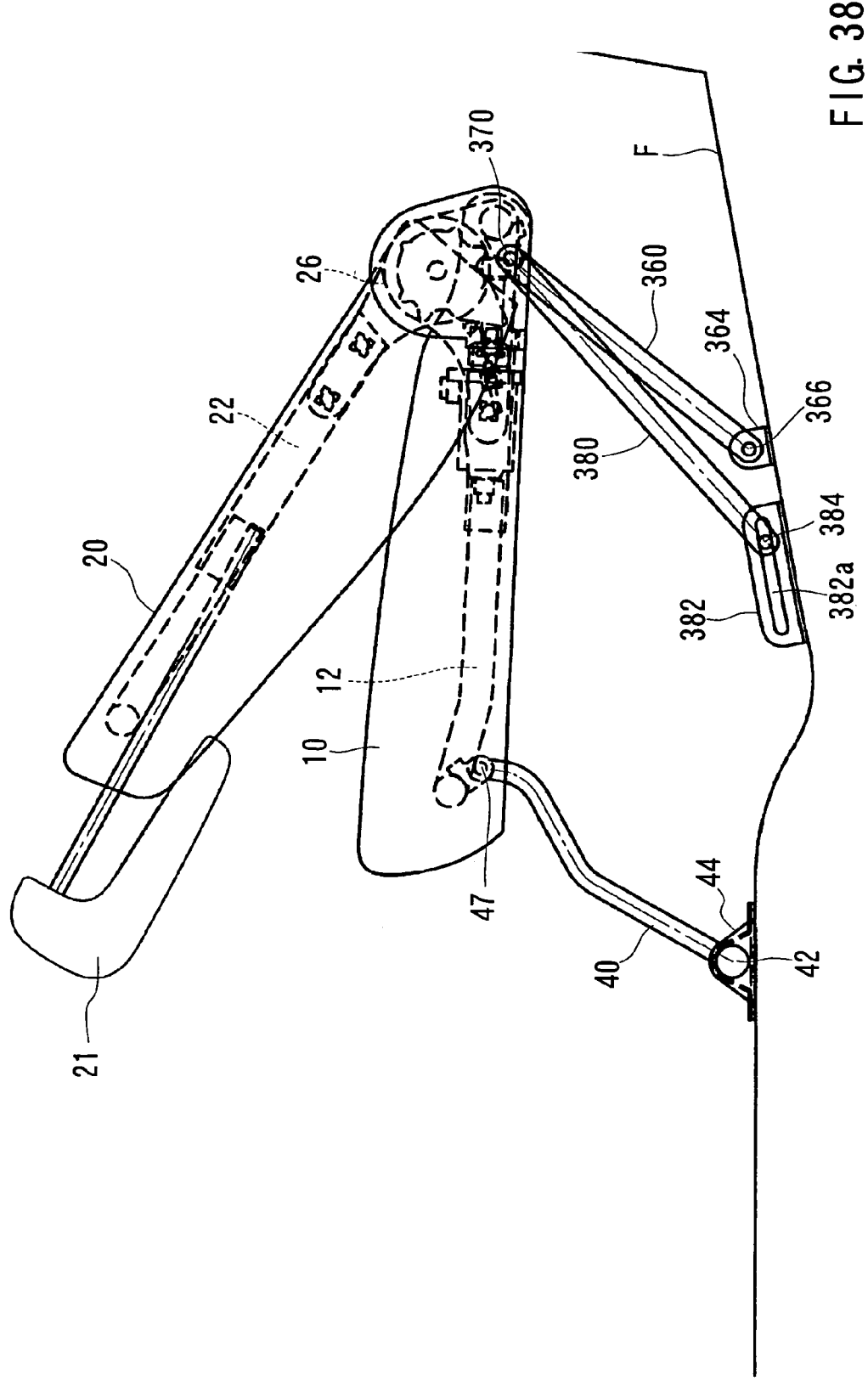
FIG. 38 is a side view of the seat similar to FIG. 13(A)
Figure 39:
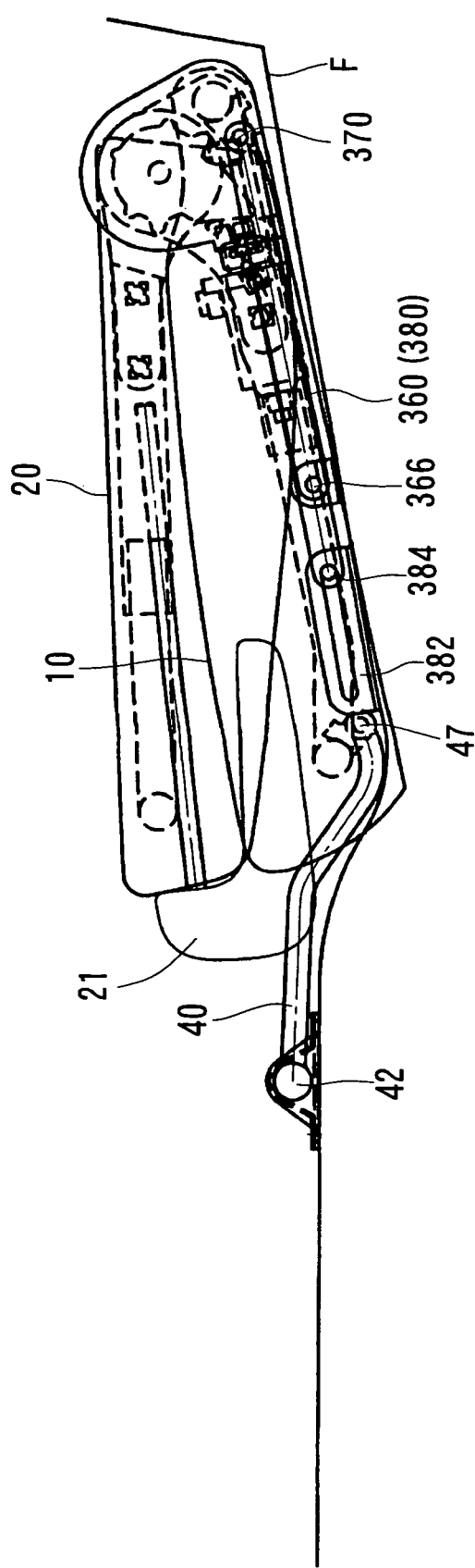
FIG. 39 is a side view of the seat similar to FIG. 16(A)

The seventh detailed representative embodiment will now described with reference to FIGS. 37 to 39.

Because the seventh embodiment relates to the first to sixth embodiments, only the constructions and elements that are different from the first to sixth embodiments will be explained in detail. Elements that are the same in the first to seventh embodiments will be identified by the same reference numerals and a detailed description of such elements may be omitted.

Figure 37:
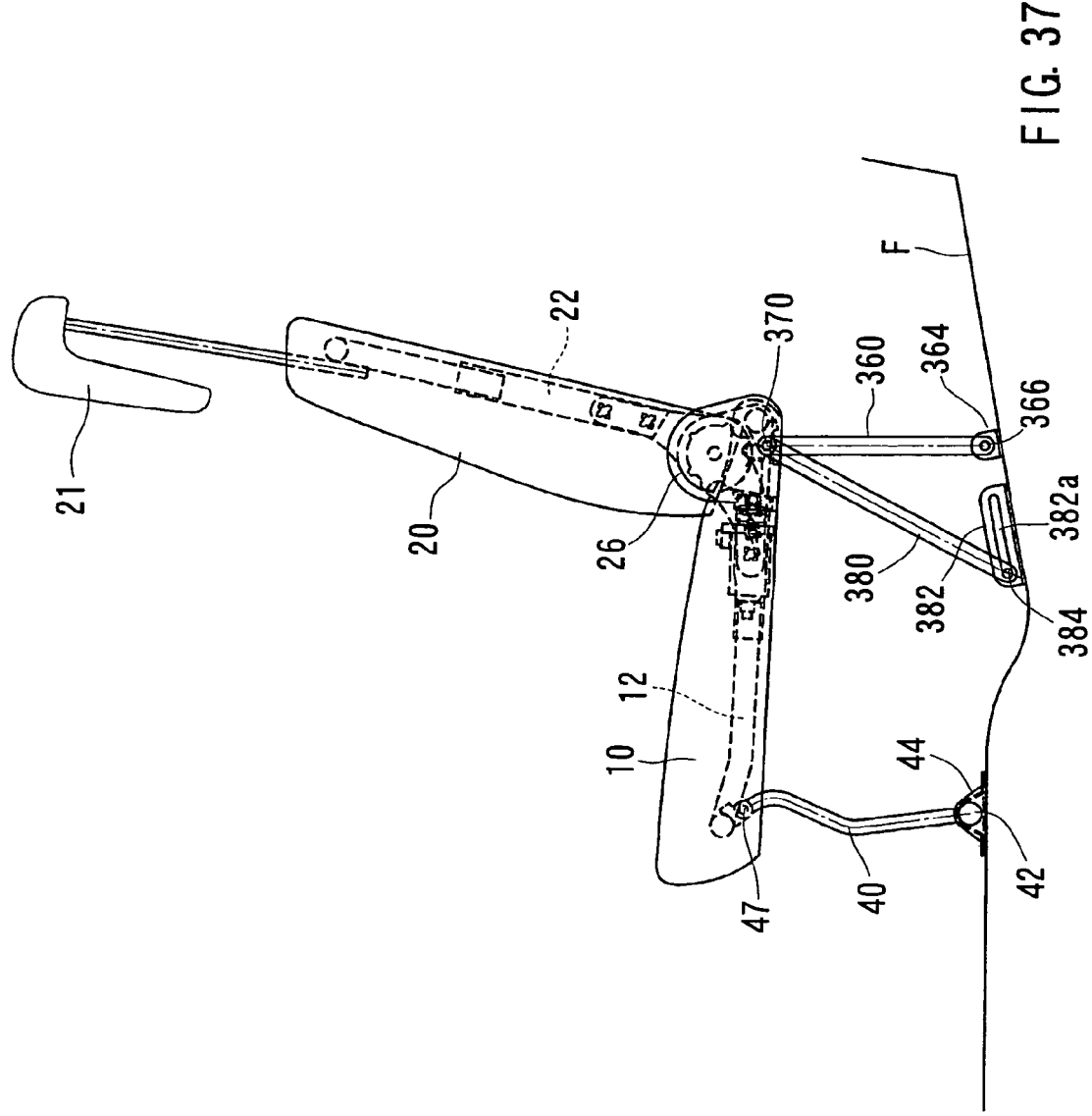
FIG. 37 is a side view of a retractable vehicle seat according to a seventh embodiment of the present invention.

As shown in FIG. 37, in this embodiment lower end portions of rear legs 360 are connected via hinge pins 366 to bearing brackets 364 fixed to the floor F. upper end portions of the rear legs 360 are connected to the cushion frame 12 via hinge pins 370. Further, the rear legs 360 are supported from front sides thereof by support members 380 (i.e., restraint mechanism or support mechanism). That is, upper end portions of the support members 380 are rotatably supported by the hinge pins 370. Further, pins 384 are provided on lower ends of the support members 380. The pins 384 engage elongated guide holes 382a of guide brackets 382 mounted on the floor F. The pins 384 are capable of longitudinally moving along the guide holes 382a. Further, although a driving means for switching the seat between the use condition and the retracted condition is not shown in FIGS. 37 to 39, this embodiment includes the driving means.

When the seat is switched from the use condition to the retracted condition, the front legs 40 and the rear legs 360 constituting a link mechanism are tilted backwardly. At this time, the pins 384 of the support members 380 move backwardly along the guide holes 382a of the guide brackets 382 (FIG. 38). In the retracted condition shown in FIG. 39, the pins 384 have been shifted to the rearmost positions within the guide holes 382a. In this condition, the support members 380 extend along the lower surface of the seat cushion 10 together with the rear legs 360. On the contrary, when the seat is returned from the retracted condition to the use condition, the front legs 40 and the rear legs 360 are rotated forwardly. At this time, the pins 384 of the support members 380 move forwards along the guide holes 382a.

Eighth Detailed Representative Embodiment

The eighth detailed representative embodiment will now described with reference to FIGS. 40 to 42.

Because the eighth embodiment relates to the first to seventh embodiments, only the constructions and elements that are different from the first to seventh embodiments will be explained in detail. Elements that are the same in the first to eighth embodiments will be identified by the same reference numerals and a detailed description of such elements may be omitted.

Figure 40:
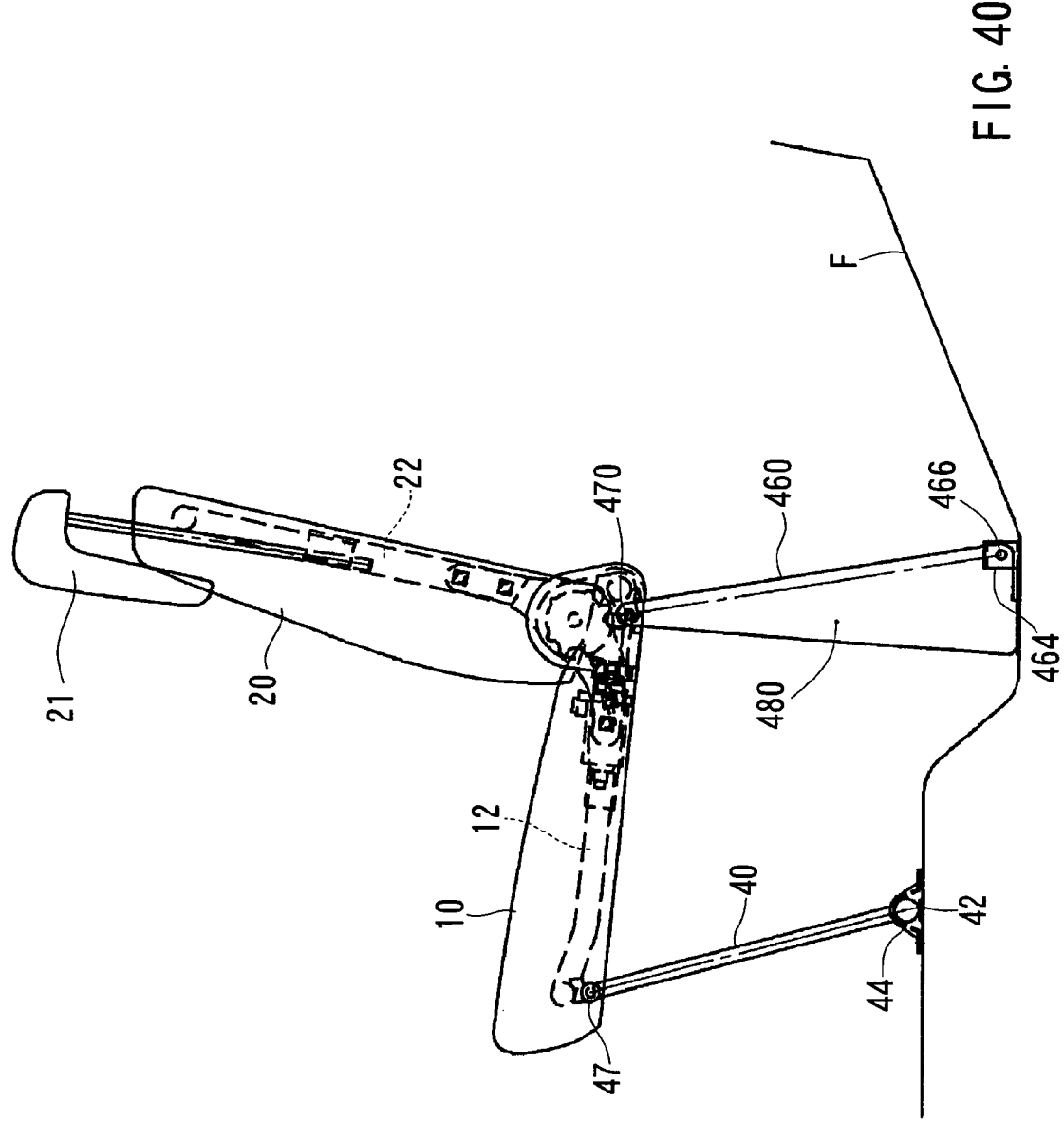
FIG. 40 is a side view of a retractable vehicle seat according to an eighth embodiment of the present invention.
Figure 41:
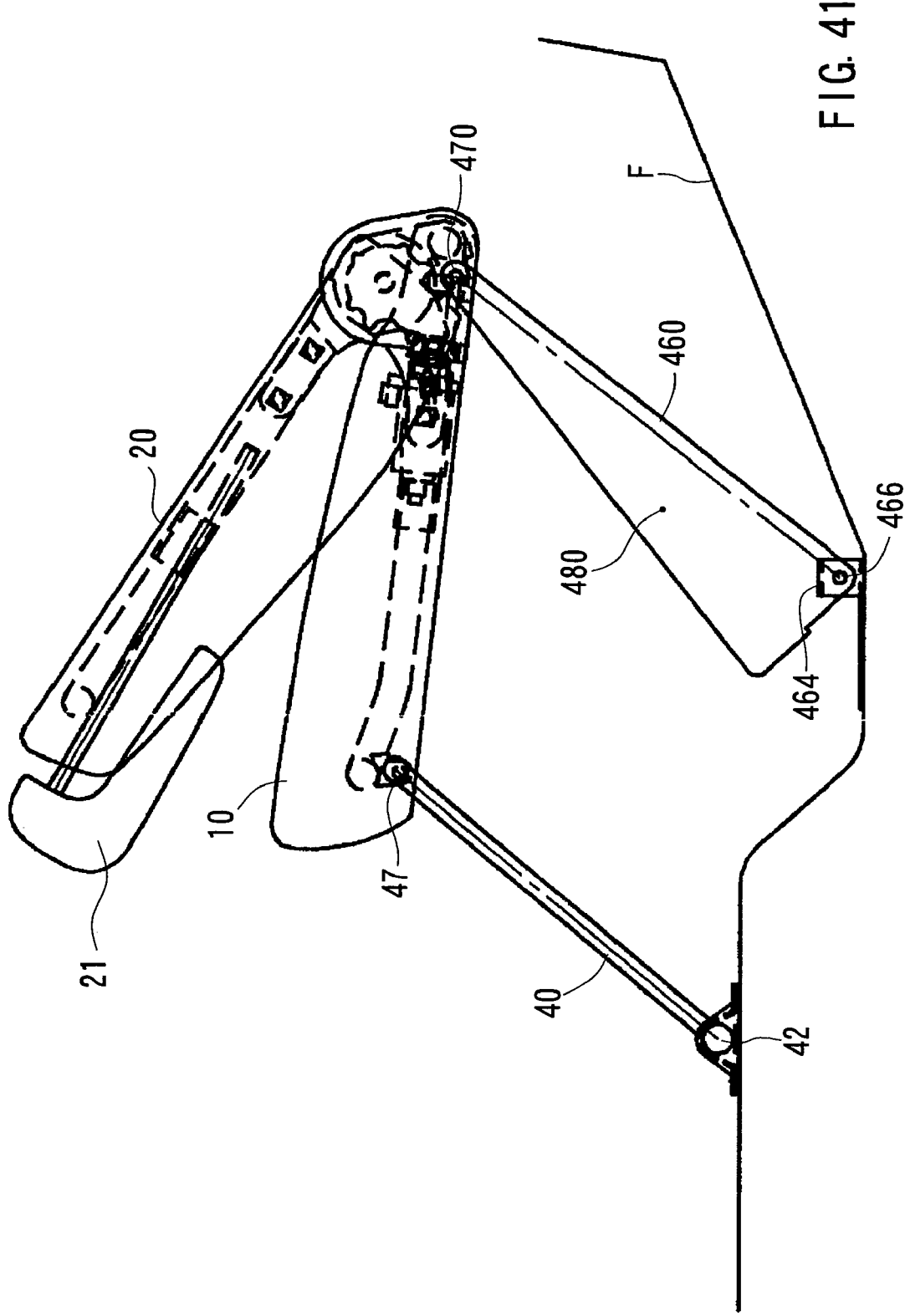
FIG. 41 is a side view of the seat similar to FIG. 13(A)
Figure 42:
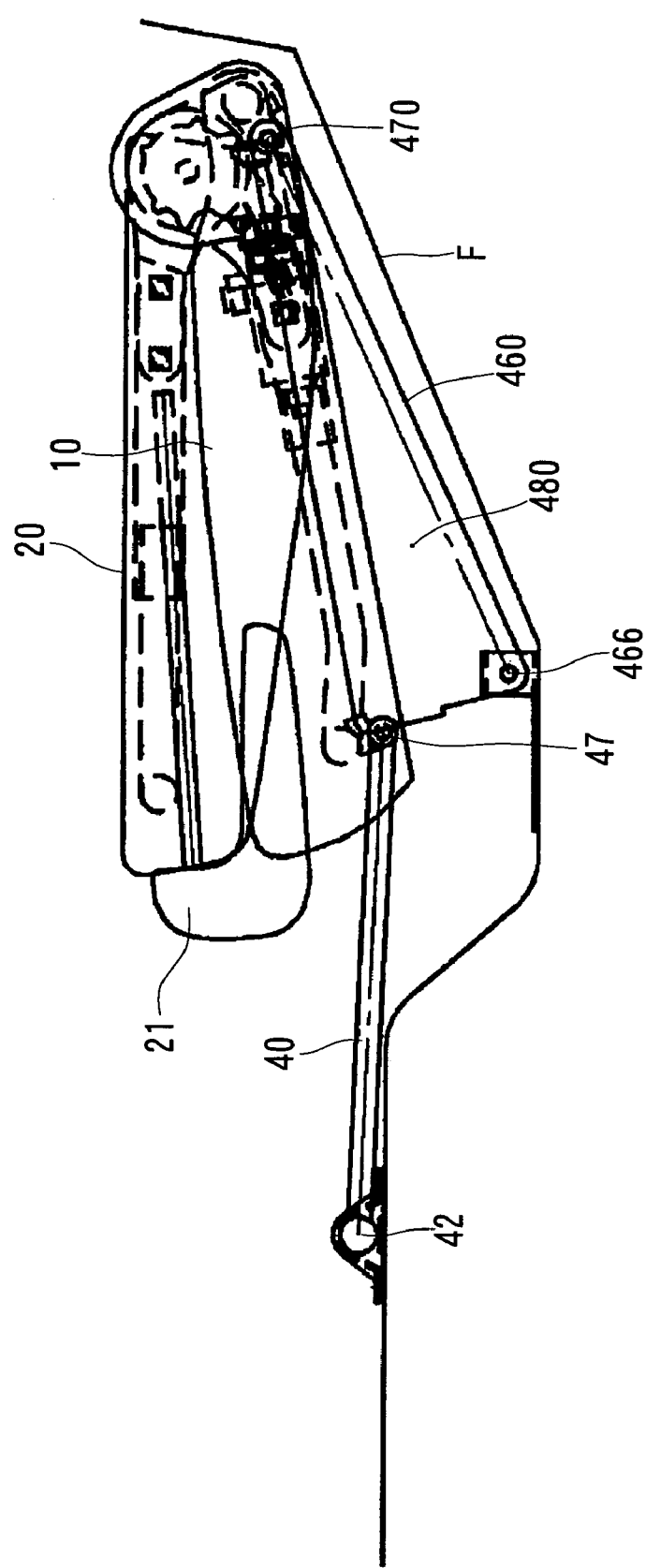
FIG. 42 is a side view of the seat similar to FIG. 16(A)

As shown in FIGS. 40 to 42, in this embodiment lower end portions of rear legs 460 are connected to bearing brackets 464 fixed to the floor F via hinge pins 466. Upper end portions of the rear legs 460 are connected to the cushion frame 12 via hinge pins 470. Further, triangular support members 480 (i.e., restraint mechanism or support mechanism) are provided in front of the rear legs 460. The support members 480 extend along the rear legs 460 and are integrated therewith. As will be apparent, each of the triangular support members 480 are appropriately shaped so that one side thereof contacts the floor F when the seat is in the use condition. Further, although a driving means for switching the seat between the use condition and the retracted condition is not shown in the drawings, this embodiment includes the driving means.

When the rear legs 460 are tilted backwardly in order to switch the seat from the use condition to the retracted condition, the support members 480 move together with the rear legs 460 (FIG. 41). In the retracted condition shown in FIG. 42, the support members 480 also fall down onto the floor F. When the seat is returned from the retracted condition to the use condition, the support members 480 rotate forwards together with the rear legs 460. In the use condition shown in FIG. 40, the rear legs 460 are supported by the support members 480.

Ninth Detailed Representative Embodiment

The ninth detailed representative embodiment will now described with reference to FIGS. 43 to 47.

Because the ninth embodiment relates to the first to eighth embodiments, only the constructions and elements that are different from the first to eighth embodiments will be explained in detail. Elements that are the same in the first to ninth embodiments will be identified by the same reference numerals and a detailed description of such elements may be omitted.

Figure 43:
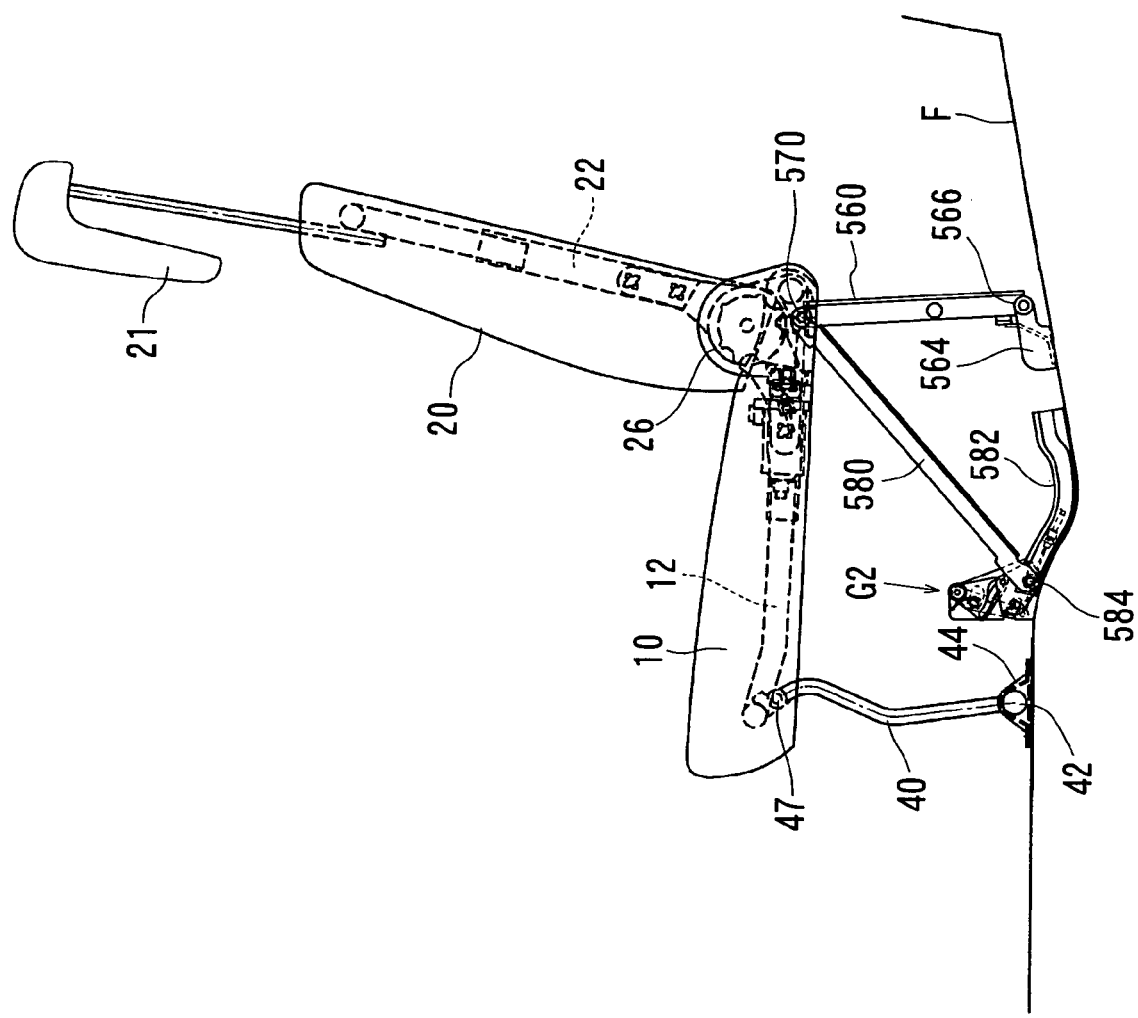
FIG. 43 is a side view of a retractable vehicle seat according to a ninth embodiment of the present invention.

As shown in FIG. 43, this embodiment uses rear legs 560 and support members 580 that respectively have a construction similar to that of the seventh embodiment. Lower end portions of the rear legs 560 are connected to bearing brackets 564 fixed to the floor F via hinge pins 566. Upper end portions of the rear legs 560 are connected to the cushion frame 12 via hinge pins 570. The rear legs 560 are supported from front sides thereof by support members 580 (i.e., restraint mechanism or support mechanism). Upper end portions of the support members 580 are rotatably supported via the hinge pins 570. Lower end portions of the support members 580 are longitudinally movably supported by means of guide rails 582 (i.e., guide mechanism) provided on the floor F. Further, lock mechanisms G2 are provided on the forward ends of the guide rails 582. The lock mechanism G2 are mounted on the floor F.

Further, although a driving means for switching the seat between the use condition and the retracted condition is not shown in the drawings, this embodiment includes the driving means. Like the first embodiment, the driving means has an operating member and the forward end portion of the operating member is connected to the lower supporting member 42 of the front legs 40.

Figure 45:
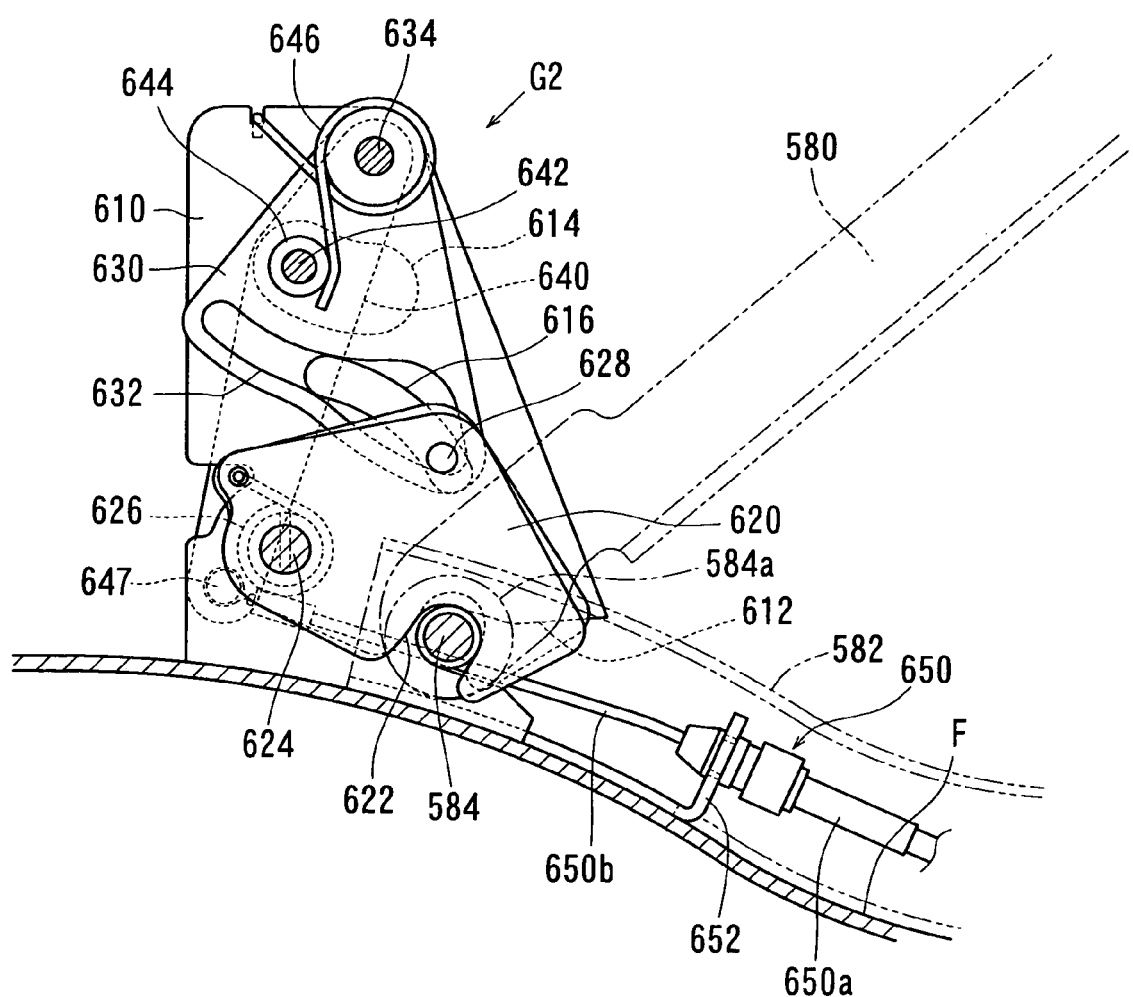
FIG. 45 is an enlarged view of a lock mechanism, illustrating a condition in which the seat is in a use condition.
Figure 46:
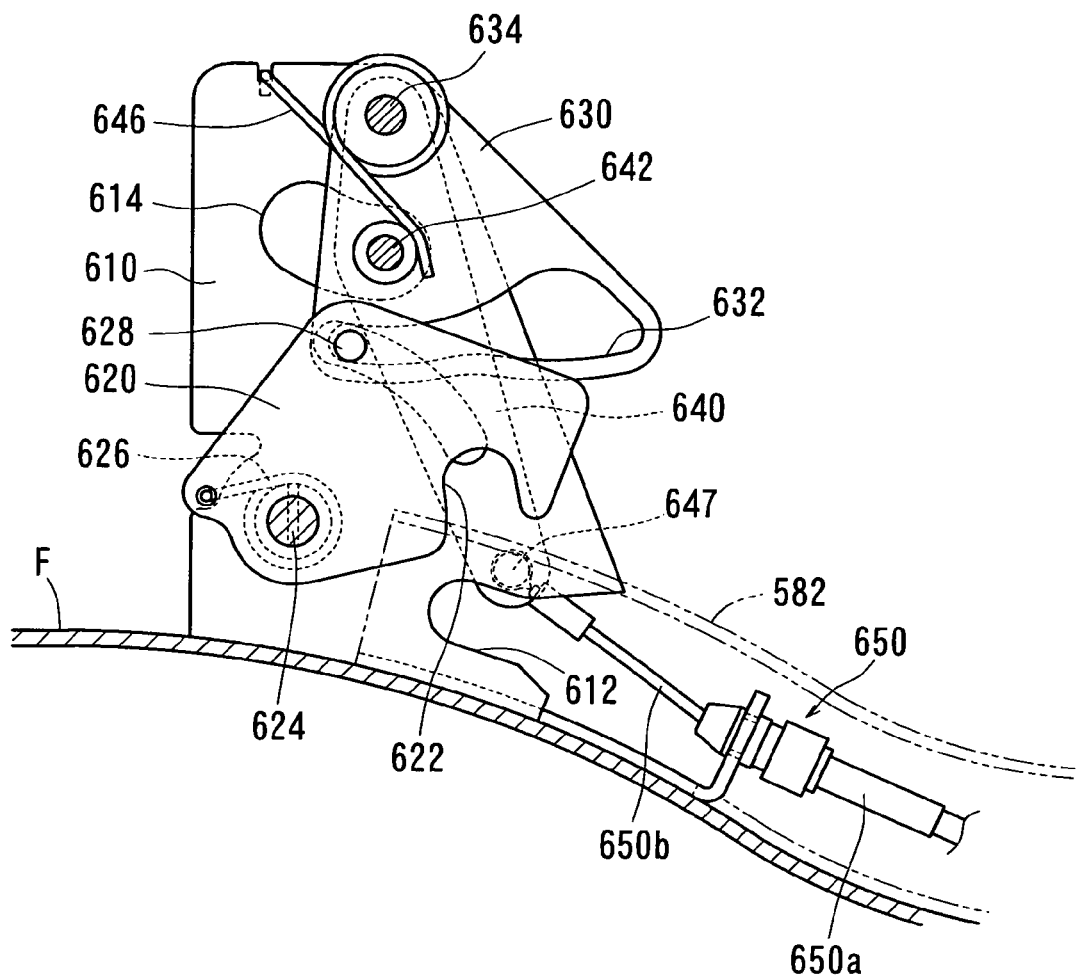
FIG. 46 is an enlarged view of the lock mechanism, illustrating a condition in which the seat is in a retracted condition.
Figure 47:
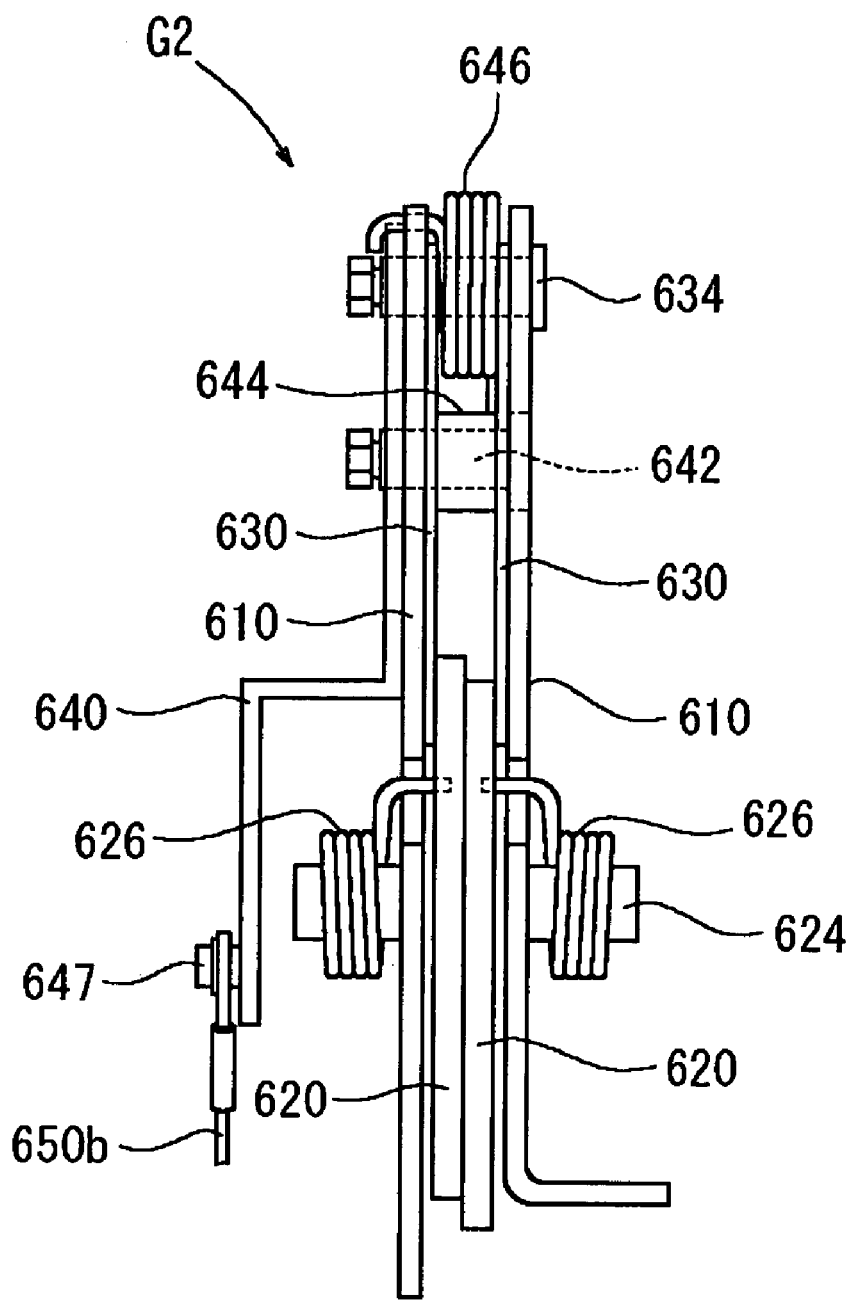
FIG. 47 is an elevational view of the lock mechanism of FIG. 45.

As shown in FIG. 45, a lower end of each of the support members 580 is provided with a pin 584 that is adapted to move along the guide rail 582. The pin 584 is provided with a roller 584a that is guided by the guide rail 582. Each of the lock mechanisms G2 is composed of a pair of latches 620 and a pair of cam members 630 that are respectively positioned between a pair of base plates 610 fixed to the floor F (FIG. 47). As best shown in FIG. 46, each of the base plates 610 has a recess 612. The recess 612 is arranged and constructed to receive the pin 584 when it is moved to a forward end portion of the guide rail 582.

The latches 620 are rotatably supported on the base plates 610 via support shafts 624. Each of the latches 620 has a downwardly opened hook portion 622. The hook portion 622 is arranged and constructed to engage the pin 584 when the pin 584 is received in the recesses 612 of the base plates 610. Further, each of the latches 620 has a cam follower pin 628. The cam follower pin 628 is positioned above the hook portion 622. Torsion springs 626 are provided on the support shafts 624. As best shown in FIG. 47, the torsion springs 626 are positioned outside of the base plates 610. One end of each of the springs 626 engages the latch 620. The other end of the spring 626 engages the support shaft 624. Thus, the latches 620 are normally urged clockwise in FIGS. 45 and 46 around the support shafts 624.

The cam members 630 are substantially reverse fan shaped plates and are positioned above the latches 620. Upper end portions of the cam members 630 are rotatably supported on the base plates 610 via a common support shaft 634. Further, lower ends portions of the cam members 630 are respectively formed with specially shaped elongated cam holes 632. The cam holes 632 receive the cam follower pins 628 of the latches 620. As best shown in FIG. 45, the base plates 610 are also formed with arcuate guide holes 616 that is arranged and constructed to guide the cam follower pins 628 when the latches 620 rotate.

As shown in FIG. 47, each of the lock mechanism G2 further includes a lever 640. An upper end portion of the lever 640 is rotatably supported via the support shaft 634. As shown in FIGS. 45 and 46, the lever 640 and the two cam members 630 are interconnected via a connection pin 642 that passes through openings 614 formed in the base plates 610. Therefore, the cam members 630 and the lever 640 can rotate integrally around the support shaft 634. A torsion spring 646 is provided on the support shaft 634. One end of the spring 646 engages one of the base plates 610 and the other end thereof engages a spring receiver (spacer) 644 that is provided on the connection pin 642. Thus, the cam members 630 and the lever 640 are normally urged clockwise in FIGS. 45 and 46 around the support shaft 634.

Each of the lock mechanisms G2 is associated with a cable 650 having an outer tube 650a and an inner cable 650b. As shown in FIGS. 45 and 46, one end of the outer tube 650a of the cable 650 is connected to a cable bracket 652 fixed to the floor F. As best shown in FIG. 47, one end of the inner cable 650b of the cable 650 is connected to a pin 647 that is provided on a lower end of the lever 640. Further, similar to the cable 79 of the first embodiment, the other end of the outer tube 650a and the other end of the inner cable 650b are arranged and constructed such that the inner cable 650b is pulled when the seat back 20 is tilted forwardly.

As best shown in FIG. 47, the latches 620 are closely arranged adjacently and are sandwiched between the cam members 630. The latches 620 are separately rotatable around the respective support shafts 624. On the contrary, the cam members 630 integrally rotate together with the lever 640 around the support shaft 634.

When the seat is in the use condition shown in FIG. 43, as shown in detail in FIG. 45, the pins 584 provided on the lower ends of the support members 580 engage the recesses 612 of the base plates 610. Further, the hook portions 622 of the latches 620 engage the pins 584. Thus, when the seat is in the use condition, the lower ends of the support members 580 are positioned on a forward end of the guide rails 582 and are connected to the floor F by means of the lock mechanisms G2. Therefore, the seat is reliably retained when in the use condition.

When each of the lock mechanisms G2 are locked, both of the latches 620 engage the pin 584. That is, the latches 620 are urged toward the pin 584 by means of the respective springs 626. Thus, the support members 580 are reliably secured to the floor F.

When the seat is switched from the use condition to the retracted condition, the seat back 20 is tilted forwardly. At this time, the inner cable 650b of the cable 650 is pulled. As a result, the lever 640 of each of the lock mechanisms G2 rotates counterclockwise around the support shaft 634 together with the cam members 630. At this time, the cam follower pins 628 of the latches 620 move along the cam holes 632 of the cam members 630, so that the latches 620 rotate counterclockwise around the support shafts 624. As a result, as shown in FIG. 46, the latches 620 are disengaged from the pin 584, so that the lower end of the support member 580 is free to move rearwardly.

Thereafter, when the front legs 40 and the rear legs 560, constituting a link mechanism, are tilted backwardly, the pin 584 (the roller 584a) of each of the support members 580 moves backwardly along the guide rail 582. Because the lower end of each of the support members 580 is guided by means of the guide rail 582 and the roller 584a (i.e., guide mechanism), the seat can be smoothly switched between the use condition and the retracted condition.

Figure 44:
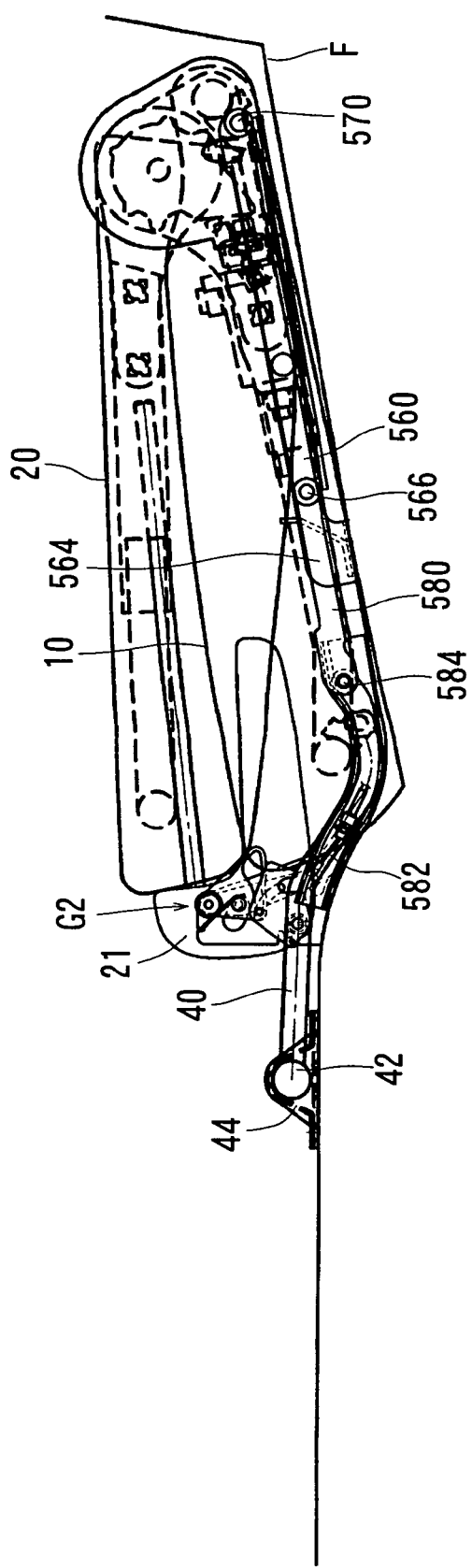
FIG. 44 is a side view of the seat similar to FIG. 16(A)

In the retracted condition shown in FIG. 44, the pin 584 provided on the lower end of each of the support members 580 is positioned on a rear end of the guide rail 582. In this condition, the support member 580 is superimposed on the rear leg 560 and is positioned adjacent to the lower surface of the seat cushion 10 and the floor F. Further, in this condition each of the lock mechanisms G2 is positioned in front of an upper end of the folded seat back 20 so as to be laterally aligned with the headrest 21.

When the seat is returned from the retracted condition to the use condition, the front legs 40 and the rear legs 560 are rotated forwardly. As a result, the pin 584 provided on the lower end of each of the support members 580 moves forwardly along the guide rail 582. When the pin 584 reaches the forward end of the guide rail 582, the pin 584 is locked by means of the lock mechanism G2.

In the above-described embodiments, the rear legs of the seat are supported by means of the support members (i.e., restraint mechanism or support mechanism). However, the front legs 40 can be supported by means of the support members on the floor F.

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A retractable seat, comprising:
   a seat cushion;
   a seat back rotatably supported on the seat cushion;
   a link mechanism for supporting the seat cushion on a floor, the link mechanism including a front leg and a rear leg that are each pivotally connected to the seat cushion and the floor, so that the seat can be switched between a use condition and a retracted condition;

a restraint mechanism provided on the floor for preventing the link mechanism from moving when the seat is in a use condition, and a lock mechanism, wherein the restraint mechanism comprises a support mechanism for supporting one of the front and rear legs on the floor when the seat is in the use condition, wherein the support mechanism comprises a support member that is separated from the leg to be supported thereby, wherein the lock mechanism is provided on the leg to be supported by the support member, wherein one end of the support member is connected to the lock mechanism, so as to be locked when the seat is in the use condition, and wherein the other end of the support member is rotatably connected to the floor.

2. A retractable seat as defined in claim 1, wherein the link mechanism is arranged and constructed to move in forward and rearward directions of the seat, and wherein the seat is switched to the retracted condition when the link mechanism is moved rearwardly.

3. A retractable seat as defined in claim 1, wherein the support mechanism, the leg supported by the support mechanism, and the floor substantially form a triangle.

4. A retractable seat as defined in claim 1, wherein the support member supports the rear leg.

5. A retractable seat as defined in claim 1, wherein the lock mechanism provided on the leg to be supported by the support member is unlocked when the seat is changed from the use condition to the retracted condition, so that the support member can move relative to the leg in synchronism with an operation of the link mechanism.

6. A retractable seat as defined in claim 5, wherein the support member is positioned behind the leg to be supported thereby when the seat is in the use condition.

7. A retractable seat as defined in claim 1, wherein the floor is formed with a receiving recess for receiving the seat, and wherein the link mechanism including the front leg and the rear leg is arranged and constructed to fold down backwardly and be received within the receiving recess when the seat is changed to the retracted condition.

8. A retractable seat as defined in claim 1, wherein the seat comprises a rear seat.

9. A retractable seat, comprising:
a seat cushion;
a seat back rotatably supported on the seat cushion;
a link mechanism for supporting the seat cushion on a floor, the link mechanism including a front leg and a rear leg that are each pivotally connected to the seat cushion and the floor, so that the seat can be switched between a use condition and a retracted condition; and
a drive mechanism for moving the front and rear leg, the drive mechanism including a reciprocable operating member, a first connection member that interconnects the front leg and the reciprocable operating member, and a second connection member that interconnects the reciprocable operating member and the front leg, wherein the front leg and the first and second connection members form a three joint link when the seat is in the use condition.

10. A retractable seat as defined in claim 9, wherein the seat comprises a rear seat.

11. A retractable seat, comprising:
a seat cushion;
a seat back rotatably supported on the seat cushion;
a link mechanism for supporting the seat cushion on a floor, the link mechanism including a front leg and a rear leg that are each pivotally connected to the seat cushion and the floor, so that the seat can be switched between a use condition and a retracted condition;
a support member for supporting one of the front and rear legs on the floor when the seat is in the use condition, the support member being separated from the leg to be supported thereby; and
a lock mechanism provided on the leg to be supported by the support member,
wherein one end of the support member is connected to the lock mechanism, so as to be locked when the seat is in the use condition,
wherein the other end of the support member is rotatably connected to the floor,
wherein the lock mechanism is unlocked when the seat back is changed from the use condition to the retracted condition, so that the support member can move relative to the leg in synchronism with an operation of the link mechanism, and
wherein the support member, the leg supported by the support member and the floor substantially form a triangle.

12. A retractable seat as defined in claim 11, wherein the seat comprises a rear seat.

* * * * *